United States Patent
Matsubara

(10) Patent No.: US 11,985,373 B2
(45) Date of Patent: May 14, 2024

(54) TELEVISION RECEIVING APPARATUS AND VOICE SIGNAL PROCESSING METHOD

(71) Applicants: HISENSE VISUAL TECHNOLOGY CO., LTD., Shandong (CN); TVS REGZA CORPORATION, Aomori (JP)

(72) Inventor: Shinzo Matsubara, Aomori (JP)

(73) Assignees: Hisense Visual Technology Co., Ltd., Qingtao (CN); TVS Regza Corporation, Aomori (JP)

( * ) Notice: Subject to any disclaimer, the term of this patent is extended or adjusted under 35 U.S.C. 154(b) by 13 days.

(21) Appl. No.: 17/993,286

(22) Filed: Nov. 23, 2022

(65) Prior Publication Data

US 2023/0088859 A1 Mar. 23, 2023

Related U.S. Application Data

(63) Continuation of application No. PCT/CN2021/073819, filed on Jan. 26, 2021.

(30) Foreign Application Priority Data

Jul. 9, 2020 (JP) .................................. 2020-118464

(51) Int. Cl.
   *H04N 21/422* (2011.01)
   *G10L 15/22* (2006.01)
   *H04N 21/472* (2011.01)

(52) U.S. Cl.
   CPC ....... *H04N 21/42203* (2013.01); *G10L 15/22* (2013.01); *H04N 21/47217* (2013.01); *G10L 2015/223* (2013.01)

(58) Field of Classification Search
   None
   See application file for complete search history.

(56) References Cited

U.S. PATENT DOCUMENTS 5,926,206 A * 7/1999 Mihara .............. H04N 21/4384
348/E7.071
2001/0047265 A1* 11/2001 Sepe, Jr. ................. G10L 15/22
704/E15.04
(Continued)

FOREIGN PATENT DOCUMENTS

CN 105872803 A 8/2016
CN 109413470 A 3/2019
(Continued)

*Primary Examiner* — Jason K Lin
(74) *Attorney, Agent, or Firm* — Meunier Carlin & Curfman LLC

(57) ABSTRACT

Provided are a television receiving apparatus and a voice signal processing method. The television receiving apparatus includes: a broadcast signal receiving and processing unit configured to process broadcast signals according to broadcast standards; a communication unit configured to connect with a network and communicate with one or more servers and one or more external devices; monitor configured to display an image; speaker configured to output voice; microphone configured to receive a voice input; interface unit configured to receive a command signal from outside or output a signal to an external device; control unit in connection with the interface unit, the communication unit, the monitor, the speaker, the broadcast signal receiving and processing unit and configured to generate control signal for a target controlled object based on voice input from outside and send the control signal to the target controlled object to implement a control operation corresponding to the voice input.

20 Claims, 18 Drawing Sheets

(56) References Cited

U.S. PATENT DOCUMENTS

| | | | | |
|---|---|---|---|---|
| 2014/0003820 A1* | 1/2014 | Lee | ................. | H04N 21/42203 |
| | | | | 398/106 |
| 2019/0147872 A1 | 5/2019 | Sasaki | | |
| 2020/0336788 A1* | 10/2020 | Kosugi | ................. | H04H 60/33 |
| 2022/0357915 A1* | 11/2022 | Iwase | ..................... | G06F 3/167 |

FOREIGN PATENT DOCUMENTS

| | | | | | |
|---|---|---|---|---|---|
| CN | 110060683 A | * | 7/2019 | ............ | G10L 15/22 |
| CN | 110060683 A | | 7/2019 | | |
| JP | 2012042111 A | | 3/2012 | | |

\* cited by examiner

TELEVISION RECEIVING APPARATUS AND VOICE SIGNAL PROCESSING METHOD

The application is a continuation application of PCT Application No. PCT/CN2021/073819, filed Jan. 26, 2021, which claims the priority from Japanese Patent Application No. 2020-118464, filed with the Japan Patent Office on Jul. 9, 2020, which is incorporated herein by reference.

FIELD OF INVENTION

Embodiments relate to a control signal generation circuit, a receiving apparatus, a system and a generation method.

BACKGROUND

In recent years, devices such as home appliances that can be remotely controlled by voices uttered by users have become widespread using the voice recognition technologies. By the control based on voice recognition, in addition to control state change of the device such as power on and off, it may control the operation timing of the devices, etc.

PRIOR REFERENCE

Patent Literature

[Patent Document 1] JP Patent Publication No. 2010-183160

BRIEF SUMMARY

However, in a scenario where voice controlling functions related to time such as the action timing of a device by voice recognition, the time (control delay) required until the voice recognition is performed on a voice command issued by a user, the command reaches the device of a controlled object and the control operation is performed may be affected. For example, during playback of an image recorded in an HDD video recorder, etc., when a command "skip 30 seconds" is issued to move the playback position to the moment after 30 seconds from the current viewing moment, it may not be the control the user expects if the control delay is relatively larger.

Embodiments of the present disclosure provide a television receiving apparatus, which includes: a broadcast signal receiving and processing unit configured to process broadcast signals according to broadcast standards; a communication unit configured to connect with a network and communicate with one or more servers and one or more external devices; a monitor configured to display an image; a speaker configured to output voice; a microphone configured to receive a voice input; an interface unit configured to receive a command signal from outside or output a signal to an external device; a control unit in connection with the interface unit, the communication unit, the monitor, the speaker, the broadcast signal receiving and processing unit and configured to: detect a voice input to the microphone based voice data input via the interface unit; in response to a voice period over a first period of time with voice input being detected, determine that a first piece of voice data in the voice period is received; send a first time point of the voice period as a trigger signal of the first piece of voice data, wherein the first time point of the voice period is a start time point or an end time point of the voice period; send the first piece of voice data for voice recognition and language processing; obtain a second time point associated with first command data corresponding to the first piece of voice data, wherein the first command data is a command content generated after the voice recognition and language processing; generate a first control signal for a target controlled object based on the command data and a delay time associated with a difference between the first time point of the voice period and the second time point associated with the first command data; send the first control signal to the target controlled object to implement a control operation corresponding to the first piece of voice data.

DESCRIPTION OF REFERENCE NUMERALS

1—Television Receiving Apparatus; 2—Playback Recording Apparatus; 3—Voice Recognition Server; 4—Language Processing Server; 5—Network; 6—Remote Controller; 7—User; 11—Tuner; 12—Broadcast Signal Receiving and Processing Unit; 13—Communication Unit; 14—Content Processing Unit; 15—Prompt Control Unit; 16—Prompt Unit; 17—Control Unit; 18—Interface Unit; 19—Voice Command Processing Unit; 21—Interface Unit; 22—Control Unit; 23—Storage Unit; 24—Data Management Unit; 191—Voice Data Processing Unit; 192—Voice Data Sending Unit; 193—Text Data Processing Unit; 194—

Command Processing Unit; 195—Time Management Unit; 196—Command Control Unit.

DETAILED DESCRIPTION OF THE EMBODIMENTS

Hereinafter, embodiments will be described with reference to the drawings.

Figure 1:
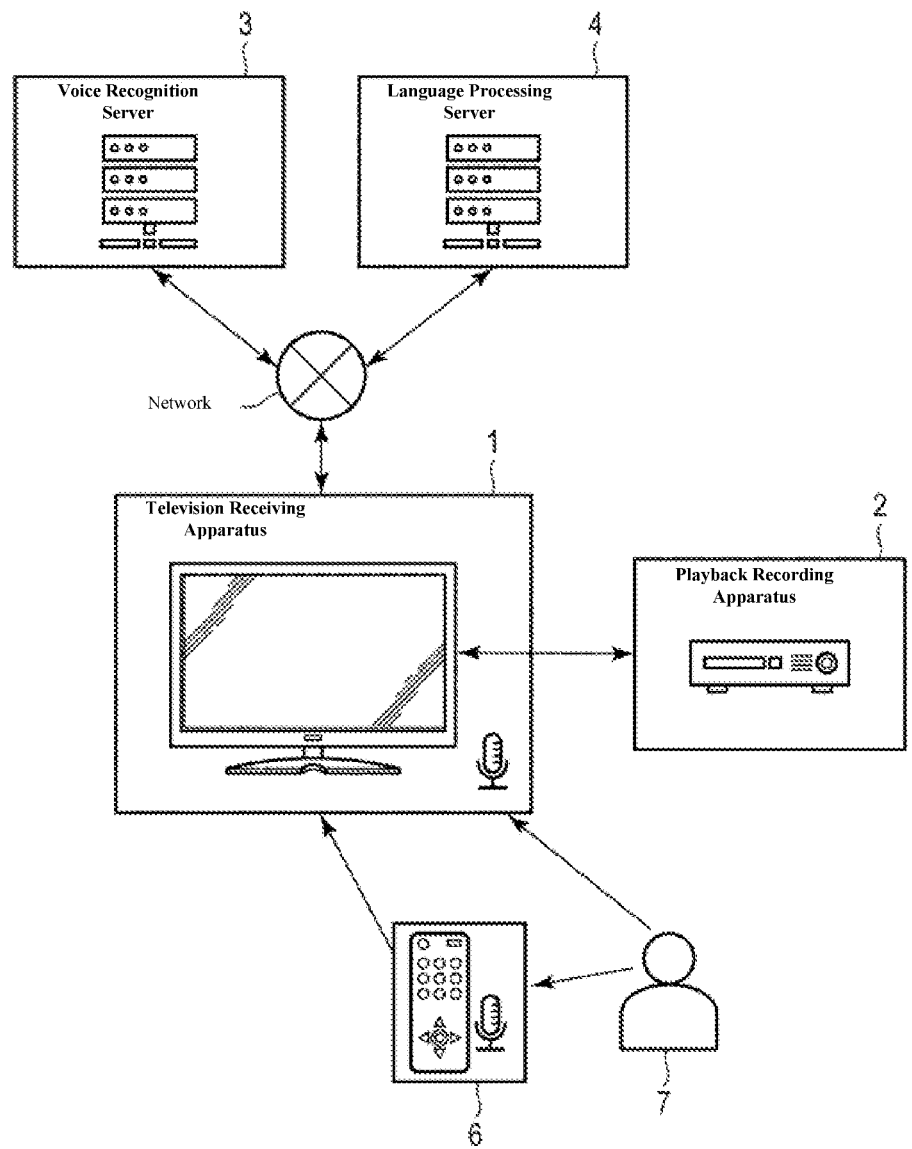
FIG. 1 is a functional block diagram showing a structure example of a system according to an embodiment.

FIG. 1 is a functional block diagram showing a structure example of a system according to an embodiment.

The television receiving apparatus 1 is a receiving apparatus for viewing the digital content, for example, a receiving apparatus (also referred to as television apparatus, TV set receiving apparatus or broadcast signal receiving apparatus) capable of receiving and viewing digital broadcasts such as terrestrial broadcast, satellite broadcast, etc., such as 2K or 4K/8K. The television receiving apparatus 1 in this embodiment has a recording and playing function, and can record or play the digital content received by the television receiving apparatus 1. By connecting with the playback recording apparatus outside, the television receiving apparatus 1 can also perform the video recording and playing of the digital content.

In addition, the television receiving apparatus 1 can control using the voice recognition technology. For example, if a user 7 issues a command by voice, the voice is received by the voice collection function such as a microphone of the television receiving apparatus 1, the command is extracted by the voice recognition technology, and various functions of the television receiving apparatus 1 are controlled by the extracted command. In addition, the television receiving apparatus 1 in this embodiment can also perform the control from a remote controller. In some embodiments, in addition to normal remote control functions such as turning on and off the power supply, for example, a microphone attached to the remote control receives the voice of the user 7, and the remote control sends the voice of the user 7 to the television receiving apparatus 1 as voice data. The television receiving apparatus 1 extracts an instruction from the received voice data, for example, by the voice recognition technology, to control various functions of the television receiving apparatus 1. The television receiving apparatus 1 in this embodiment outputs a control signal generated based on the extracted instruction to the playback recording apparatus 2 to control the playback recording apparatus 2.

In addition, the television receiving apparatus 1 has, for example, a communication function for connecting with a network 5 such as Internet, and can exchange data with various servers (which may be servers on the cloud) via the network.

The playback recording apparatus 2 is, for example, an optical disc player or an HDD recorder; and can, for example, record and play the content-data such as broadcast signals, voices, images, etc. received from the Internet. In addition, the playback recording apparatus 2 shown in FIG. 1 is shown as an external device connected with the television receiving apparatus 1, but may also be built in the television receiving apparatus 1. Moreover, the playback recording apparatus 2 may also be a Set Top Box (STB) capable of recording and playing the content data, a voice player, a PC, or the like.

The voice recognition server 3 is a server capable of voice recognition provided on the network 5, and includes, for example, a computer having a CPU, a memory, etc. The voice recognition server 3 receives the digital data (hereinafter, referred to as voice data) from the voice waveform of the voice of the user 7 received by the microphone or the like via the network 5, determines or recognizes the voice uttered by the user 7, and outputs the recognized voice as text data (which may also be called recognized voice data). The voice recognition technology is a general technology, and the detailed explanation thereof is omitted.

The language processing server 4 selects the instruction data based on the recognized voice data (text data) output from the voice recognition server 3, and outputs the instruction data to the television receiving apparatus 1. The language processing server 4 may also pre-store the correspondence between the recognized voice data and the instruction data.

The network 5 is a network with which the television receiving apparatus 1, the voice recognition server 3, the language processing server 4 and the like can connect and communicate, and is, for example, the Internet. Furthermore, the network 5 is not limited to the Internet, and may be a network including a plurality of different networks irrespective of wired or wireless if all devices can communicate.

The remote controller 6 is a remote controller for remotely controlling the television receiving apparatus 1. The remote controller 6 in this embodiment may have, for example, a voice collection function such as a microphone capable of receiving the voice uttered by the user 7. Furthermore, the remote controller 6 may also have an interface function such as BlueTooth (registered trademark) for transmitting the received voice to outside.

Figure 2:
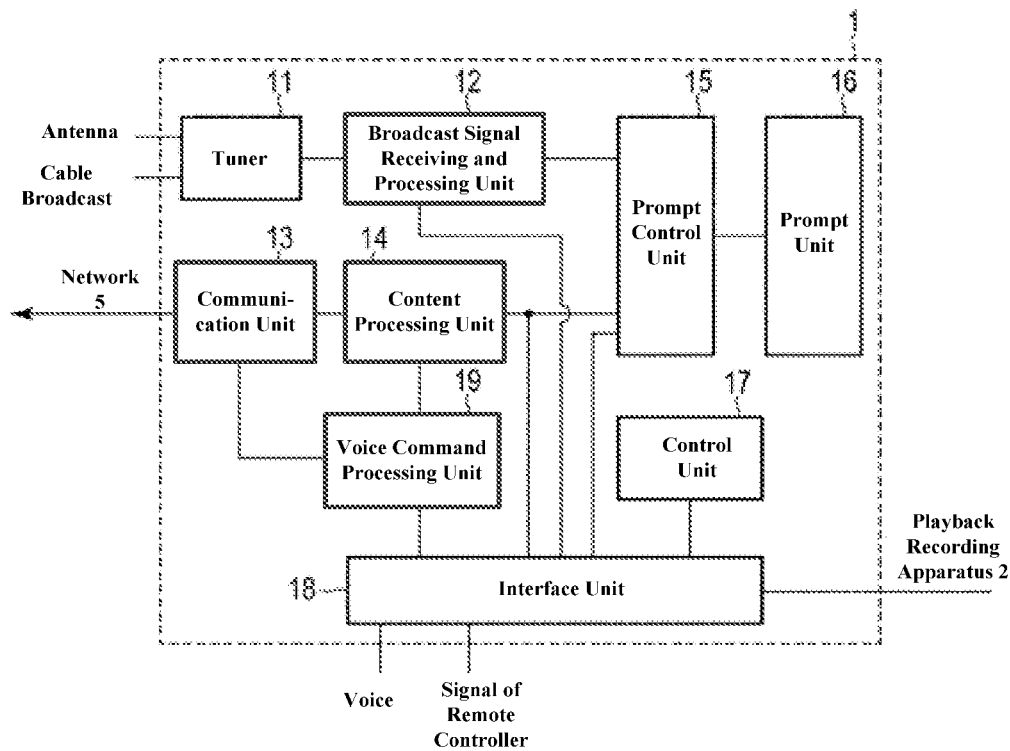
FIG. 2 is a functional block diagram showing a structure example of a television receiving apparatus according to an embodiment.

FIG. 2 is a functional block diagram showing a structure example of a television receiving apparatus according to an embodiment.

The television receiving apparatus 1 is a device that receives and processes a signal superimposed with the digital content to obtain and watch or record the digital content.

The tuner 11 is configured to receive radio waves in a desired frequency band from an antenna, cable broadcast or the like, and obtain and output broadcast signals (digital data) through demodulation processing or the like.

The broadcast signal receiving and processing unit 12 is configured to process the broadcast signal received from the tuner 11 in accordance with the digital broadcast standards, and obtain and output the content data such as images, voices, texts, etc. For example, the digital broadcast standards may be the MPEG2 TS protocol in 2K digital broadcast, the MPEG Media Transport mode (MMT protocol) in 4K/8K digital broadcast, etc., or may correspond to both through a plurality of tuners. The processing for the digital broadcast standard includes: demultiplexing processing for separating the digital data input from the tuner 11 into digital data streams of the content data such as images, voices, texts, etc., decoding processing for error correction codes, password decoding processing for decoding the encrypted data, decoding processing for encoding (image encoding, voice encoding, text encoding, etc.) performed on each content data, etc.

The communication unit 13 is connected with the network 5 and communicates with various servers and devices on the network 5. For example, the exchange of digital data is performed by transmission and reception processing according to predetermined communication protocols such as TCP/IP and UDP/IP.

The content processing unit 14 receives, for example, the content data provided by a content server (not shown) in the network 5 via the communication unit 13. The content processing unit 14 is configured to perform decoding processing for the encoding processing performed by the content server on the data received via the communication unit 13, and acquire and output the content data such as images, voices, texts, etc. In some embodiments, the content processing unit 14 is configured to perform, as decoding processing, demultiplexing processing (separation processing), decoding processing for error correction codes, decoding processing for encoded content data (images, texts, voices, etc.), etc.

The prompt control unit 15 is configured to adjust and output the output timing, the display method and the like with respect to the content data output from the broadcast signal receiving and processing unit 12, the content processing unit 14 or the playback recording apparatus 2. It may also perform demultiplexing processing (separation processing), decoding processing for error correction codes, decoding processing for encoded content data (images, texts, voices, etc.), etc. at the data output from the playback recording apparatus 2 according to the data content recorded in the playback recording apparatus 2, and then input the data to the prompt control unit 15.

The prompt unit 16 is, for example, a monitor that displays images and texts, a speaker that outputs voice, etc. The prompt unit 16 is configured to output the content data from the prompt control unit 15 such as images, texts, voices, etc. The user views broadcast signals and the digital content provided by a content server (not shown) by viewing images, texts, voices, etc. output from the prompt unit 16.

The control unit 17 is configured to control various functions of the television receiving apparatus 1. In some embodiments, the control unit 17 receives various command signals from the interface unit 18, and controls various function of the television receiving apparatus 1 based on the received various command signals. For example, when it is specified to watch the content based on a broadcast signal or watch the content from the content server via the remote controller 6, the control unit 17 receives a command signal from the remote controller via the interface unit 18 to control the functions of the television receiving apparatus 1, so that the television receiving apparatus 1 performs the user-specified actions. Furthermore, in FIG. 2, it may also exchange data with the control unit 17, especially with functional modules that are not connected.

The interface unit 18 is an interface for receiving a command signal from the remote controller 6 or the like or outputting a signal to an external device. For example, the interface unit 18 is configured to receive a command signal from a switch (not shown) of the television receiving apparatus 1, the remote controller 6 or the like, and outputs the command signal to the control unit 17 of the television receiving apparatus 1. Instead of the remote controller 6, an interface for receiving a command signal from a terminal such as a smartphone (not shown) may be provided. In addition, the interface unit 18 may also have an interface for connecting with an external device, for example, an interface for connecting with the playback recording apparatus 2 outside of the television receiving apparatus 1. For example, the television receiving apparatus 1 controls the playback recording apparatus 2 or exchanges data with the playback recording apparatus 2 via the interface unit 18.

In addition, the interface unit 18 in this embodiment includes, for example, a microphone for receiving voice from the outside of the television receiving apparatus 1. The interface unit 18 may also output the voice received through the microphone as voice digital data (which may also called voice data) converted by analog-digital conversion or the like.

The voice command processing unit 19 is configured to output the voice digital data received from the interface unit 18 to the voice recognition server 3 via the communication unit 13, and receives the recognized voice data (text data) from the voice recognition server 3. The voice command processing unit 19 outputs the received recognized voice data to the language processing server 4 via the communication unit 13, and receives the command data from the language processing server 4. The voice command processing unit 19 generates a control signal based on the received command data, and outputs the control signal to an external device (e.g., the playback recording apparatus 2) via the interface unit 18.

Figure 3:
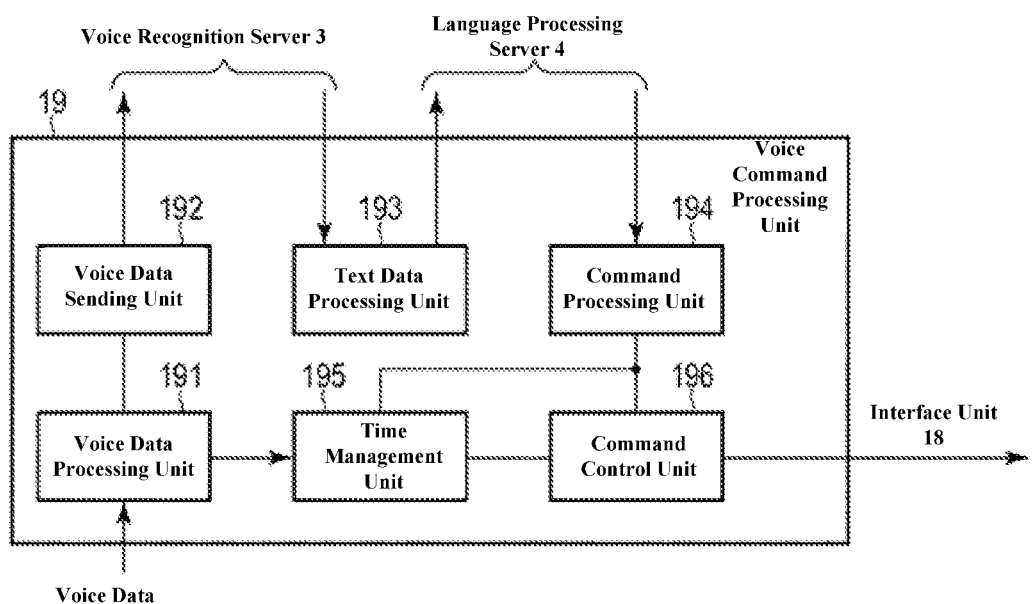
FIG. 3 is a functional block diagram showing a structure example of a voice command processing unit according to an embodiment.

FIG. 3 is a functional block diagram showing a structure example of a voice command processing unit according to an embodiment.

The voice data processing unit 191 is configured to detect the presence or absence of voice input to the microphone based on the voice data input from the interface unit 18. The voice data processing unit 191 can determine a period of time with voice (voice period) and a period of time without voice (no voice period) according to the voice data, for example, determine that a certain piece of voice data is received if a voice period over a certain period of time is detected, and output this piece of voice data to the voice recognition server 3 to perform the voice recognition on the piece of voice data. The so-called piece of voice data is equivalent to words, texts, etc. uttered by the user 7, but is not particularly limited to these, and may be just noise. The voice data processing unit 191 of this embodiment outputs the timing (referred to as count start timing) of the start time point or end time point of the voice period to the time management unit 195. The timing output from the voice data processing unit 191 may be, for example, a trigger signal such as a pulse, or may be the start point or end point (timestamp) of the voice period (or no voice period).

The voice data sending unit 192 is configured to output the voice data input from the voice data processing unit 191 to an external device such as the voice recognition server 3 via the communication unit 13.

The text data processing unit 193 is configured to receive the recognized voice data output from the voice recognition server 3 via the communication unit 13. Furthermore, the text data processing unit 193 is configured to output the received recognized voice data to the language processing server 4 via the communication unit 13.

The command processing unit 194 is configured to receive the command data output from the language processing server 4 via the communication unit 13. Furthermore, upon receiving the command data, the command processing unit 194 outputs the reception timing of the command data to the time management unit 195. The output reception timing may be, for example, a trigger signal such as a pulse, or may be a time point (timestamp) at which the command data is received. It is desirable that the command processing unit 194 shares a clock for generating the output reception timing with functions in the voice command processing unit 19, particularly the voice data processing unit 191. The command processing unit 194 outputs the received command data to the command control unit 196.

The time management unit 195 is configured to calculate an adjustment parameter based on the count start timing received from the voice data processing unit 191 and the reception timing of the command data received from the command processing unit 194. For example, the adjustment parameter is obtained as the difference between the reception timing of the command data and the count start timing.

That is, the adjustment parameter may be defined as the time from when the voice data processing unit 191 receives the voice data from the user to when the command processing unit 194 receives or outputs the command data corresponding to the voice data from the user. Of course, the adjustment parameter may also take various times such as other transmission delay time into consideration irrespective of this definition. Furthermore, this embodiment describes an example where the voice data processing unit 191 and the command processing unit 194 decide the reception timing of the command data and the count start timing, but not limited to this structure.

The command control unit 196 is configured to generate a control signal based on the command data output from the command processing unit 194 and the adjustment parameter output from the time management unit 195, and output the generated control signal. In some embodiments, in the case of receiving a voice command "skip 30 seconds" to skip to and play the content data after 30 seconds from current playing moment as the command data, the command control unit 196 adds/subtracts the time of the adjustment parameter amount (set to n seconds) to/from 30 seconds, and generates a control signal such as command "skip 30−n seconds" or command "skip 30+n seconds", etc. Furthermore, this embodiment describes an example where the processing time of voice recognition is set as an adjustment parameter n. However, for example, the delay time period from a time point when the command control unit 196 outputs a control signal to a target control device to a time point when the target control device actually executes the command may also be considered as an adjustment parameter n, for more precise control.

Furthermore, in this embodiment, the voice recognition server 3 is used for the voice recognition function and the language processing server 4 is used for the language recognition function, but the television receiving apparatus 1 (for example, the voice command processing unit 19) may have the voice recognition function and language recognition function.

Figure 4:
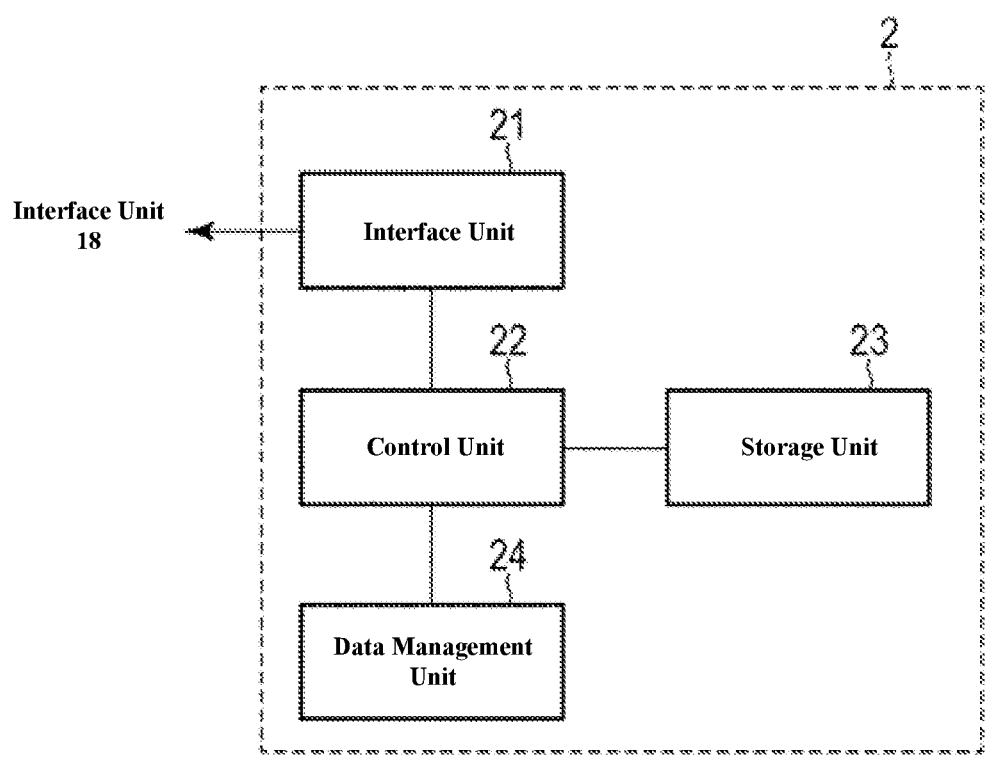
FIG. 4 is a block diagram showing an example of a functional structure of a playback recording apparatus according to an embodiment.

FIG. 4 is a block diagram showing an example of a functional structure of a playback recording apparatus according to an embodiment. The playback recording apparatus 2 is configured to store the content data output from the broadcast signal receiving and processing unit 12 and the content processing unit 14, and output the content data to the prompt control unit 15 according to a playback request or the like, to be output from the prompt unit 16 as images, texts and voices. The user views the digital content stored in the playback recording apparatus 2 by viewing the images, texts and voices output from the prompt unit 16.

The interface unit 21 is an interface for transmitting and receiving control signals, data and others with an external device, and may be, for example, an interface corresponding to HDMI (registered trademark), USB, or the like.

The control unit 22 controls various functions in the playback recording apparatus 2 based on a control signal received via the interface unit 21, a control signal input from a switch (not shown) for the playback recording apparatus 2, a remote control, or the like. The control unit 22 of this embodiment, for example, processes the control signal such as command "skip 30−n seconds" or command "skip 30+n seconds" generated by the command control unit 196 in addition to the normal time commands such as command "skip 30 seconds", and controls various functions in the playback recording apparatus based on these control signals.

The storage unit 23 is, for example, an HDD (Hard Disk Drive), and configured to store the input data or output the stored data under the control of the control unit 22 or the like.

The data management unit 24 is configured to store, for example, the management data stored on the HDD (Hard Disk Drive), that is, the information related to the data stored in the storage unit 23. The data management unit 24 in this embodiment stores, for example, the correspondence between the logical address of the content data stored in the storage unit 23 and the broadcast time of the content data or the elapsed time from the start time point of the content data. The control unit 22 can obtain the content data specified by a time from the storage unit 23 based on the data management unit 24.

First Embodiment

In this embodiment, an example where the time shift instruction is generated based on the processing time of voice recognition of the voice data received from a user will be described. The so-called time shift instruction is an instruction to specify a time shift amount towards the future or past with reference to a current moment or the like and move forward or backward the time shift amount to perform a functional operation. For example, there are instructions such as "skip 30 seconds" or "rewind 10 seconds" to move the content data currently being played forward by 30 seconds in the future or backward by 10 seconds in the past and play it. Moreover, an instruction to designate a time window such as a preset chapter or scene is also included, instead of time designation.

Hereinafter, the actions of this embodiment will be described with reference to the drawings.

The user 7 views a program (content data) stored in the storage unit 23 of the playback recording apparatus 2 through the television receiving apparatus 1. The user 7 speaks "skip 30 seconds" in order to play the content data 30 seconds later from the currently-played portion of the program. The voice command "skip 30 seconds" is collected by the microphone in the interface unit 18 of the television receiving apparatus 1, subjected to the AD-DA conversion and the like, and then input to the voice data processing unit 191 as voice data. In addition, the voice of "skip 30 seconds" may also be input into the microphone of the remote controller 6, and input from the remote controller 6 to the interface unit 18 of the television receiving apparatus 1 by wireless transmission.

Figure 5:
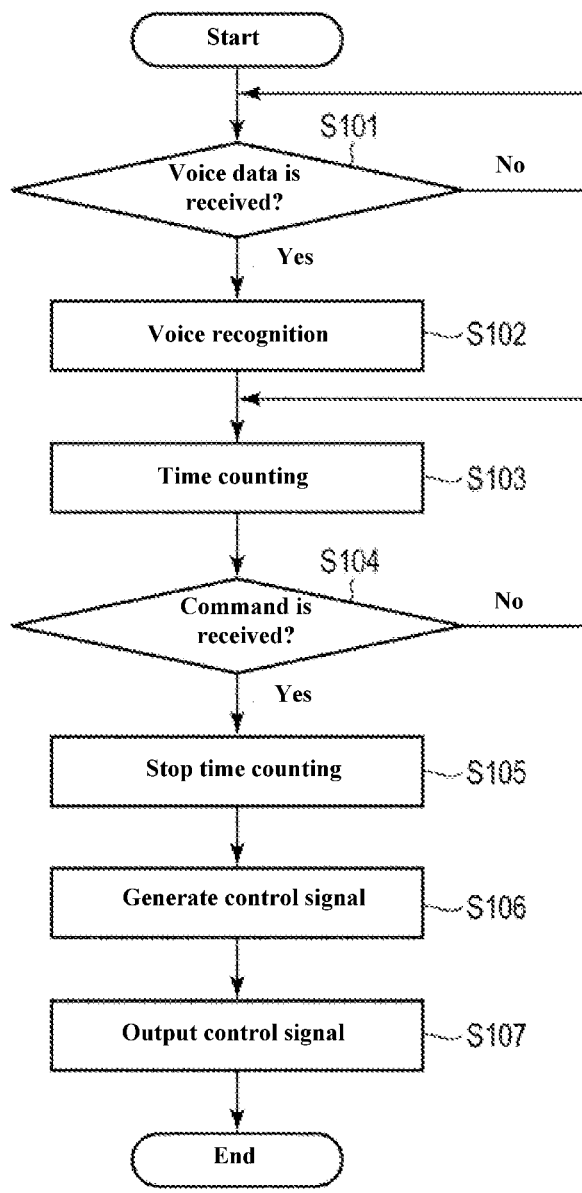
FIG. 5 is a flowchart showing an example of processing actions of the voice command processing unit according to a first embodiment.

FIG. 5 is a flowchart showing an example of processing actions of the voice command processing unit according to the first embodiment.

The voice data processing unit 191 monitors the input level or the like of the input voice data, and determines a voice period or a no voice period. When detecting a voice period over a certain period of time, the voice data processing unit 191 sends the voice data in the voice period to the voice recognition server 3 via the voice data sending unit 192, the communication unit 13 and the network 5 to start the voice recognition of the voice data (Yes branch in step S101, and S102). The voice data processing unit 191 starts the voice recognition of the voice data and outputs a pulse for indicating the count start timing to the time management unit 195. If the time management unit 195 receives the pulse for indicating the count start timing, the time management unit 195 starts counting (step S103).

On the other hand, the voice recognition server 3 that has received the voice data from the voice command processing unit 19 performs voice recognition on the received voice data, and outputs the obtained text data (recognized voice data) to the text data processing unit 193 (step S102). The text data processing unit 193 outputs the received recognized voice data to the language processing server 4. If the command processing unit 194 receives the command data from the language processing server 4, the command processing unit 194 outputs a pulse for indicating the reception timing of the command data to the time management unit 195 (Yes branch in step S104). If the time management unit 195 receives the pulse for indicating the reception timing of the command data from the command processing unit 194, the time management unit 195 stops counting (step S105). Furthermore, the time management unit 195 continues to count until the pulse for indicating the reception timing of the command data is received from the command processing unit 194 (No in step S104).

If the time management unit 195 stops counting, it outputs the count value (set to n seconds) to the command control unit 196. Moreover, at the same timing as this, the command processing unit 194 outputs the command data to the command control unit 196. The count value n output by the time management unit 195 is equivalent to a control delay time from a first time point when the voice data processing unit 191 receives the voice data to a second time point when the voice data is voice-recognized and language-recognized and received by the command processing unit 194 as command data.

The command control unit 196 generates a control signal for controlling the external device based on the count value n and the command data. In some embodiments, when the command data is "skip 30 seconds", a control signal that skips 30−n seconds, i.e., the time shorter than 30 seconds by the control delay n, is generated.

Figure 6A:
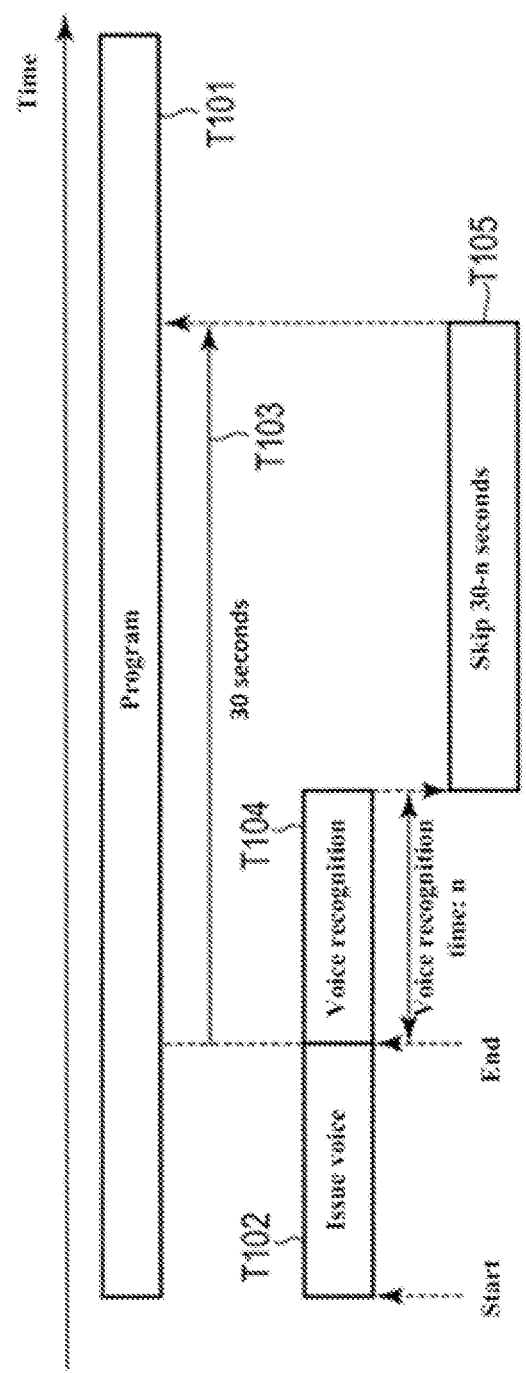
FIG. 6A and FIG. 6B are diagrams showing examples of a time relationship between a voice command and a control signal according to an embodiment.
Figure 6B:
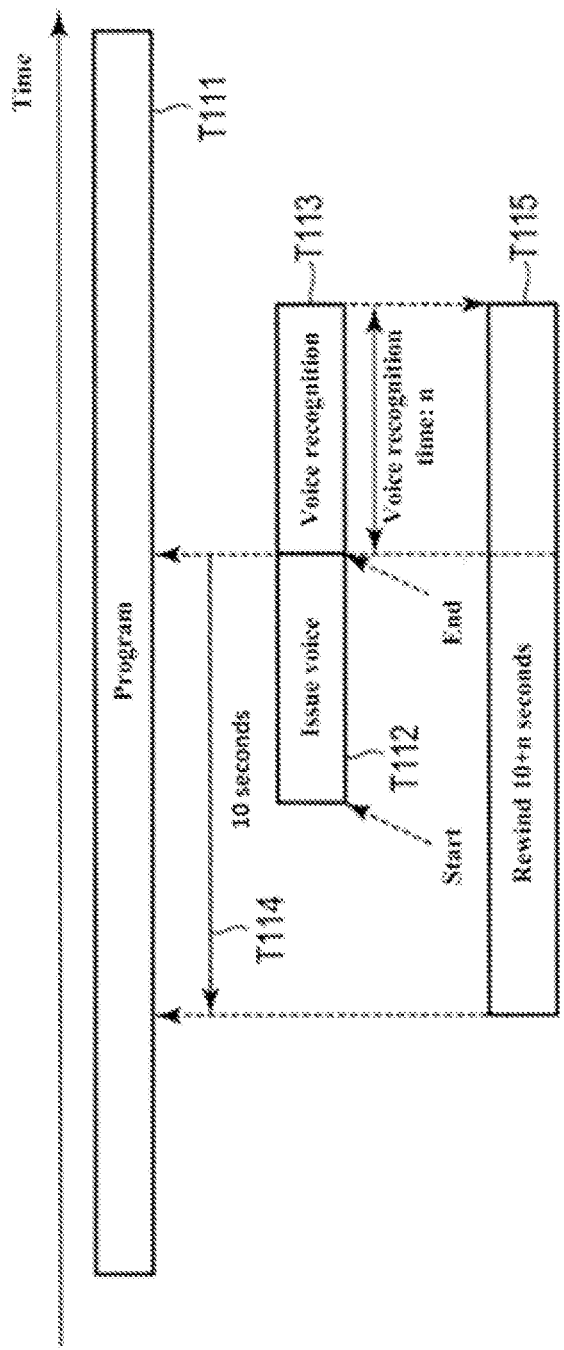

FIG. 6A and FIG. 6B are diagrams showing examples of a time relationship between a voice command and a control signal according to an embodiment, and FIG. 6A is a diagram showing an example of a control action based on the command "skip 30 seconds". The time axis is set from left to right (denoted as "time" in the diagram).

The time window T101 represents the playing time (from the past to the future) of a program being watched by a user. The time window T102 represents the length of time of a voice command spoken by the user. The start of the time window T102 represents a time point when the user starts to speak the voice command, and the end of the time window T102 represents a time point when the user ends the utterance of the voice command. The end moment of the time window T102 is equivalent to the timing at which the voice data processing unit 191 determines that "voice data has been received" in step S101 of FIG. 5. The time window T103 represents a location to which the playback skips in the program as shown by the time window T101 in the case of executing a command (command "skip 30 seconds") based on the received voice data immediately when the voice data processing unit 191 determines that "voice data has been received". The time window T104 is equivalent to the time until the voice command spoken by the user is voice-recognized and the command control unit 196 obtains the command data, that is, the count value n output by the time management unit 195 in step S105 of FIG. 5.

Here, the time window T103 represents an example in the case when the command "skip 30 seconds" is ideally executed. However, the command "skip 30 seconds" is actually executed from the end of the time window T104. Therefore, the command control unit 196 in this embodiment subtracts the time equivalent to the time window T104 (equivalent to the control delay), i.e., the count value n, from 30 seconds, and generates a control signal as "skip 30−n seconds" (step S106 of FIG. 5). The command control unit 196 outputs the generated control signal of "skip 30−n seconds" to the external device, i.e., the playback recording apparatus 2 (step S107).

Figure 7:
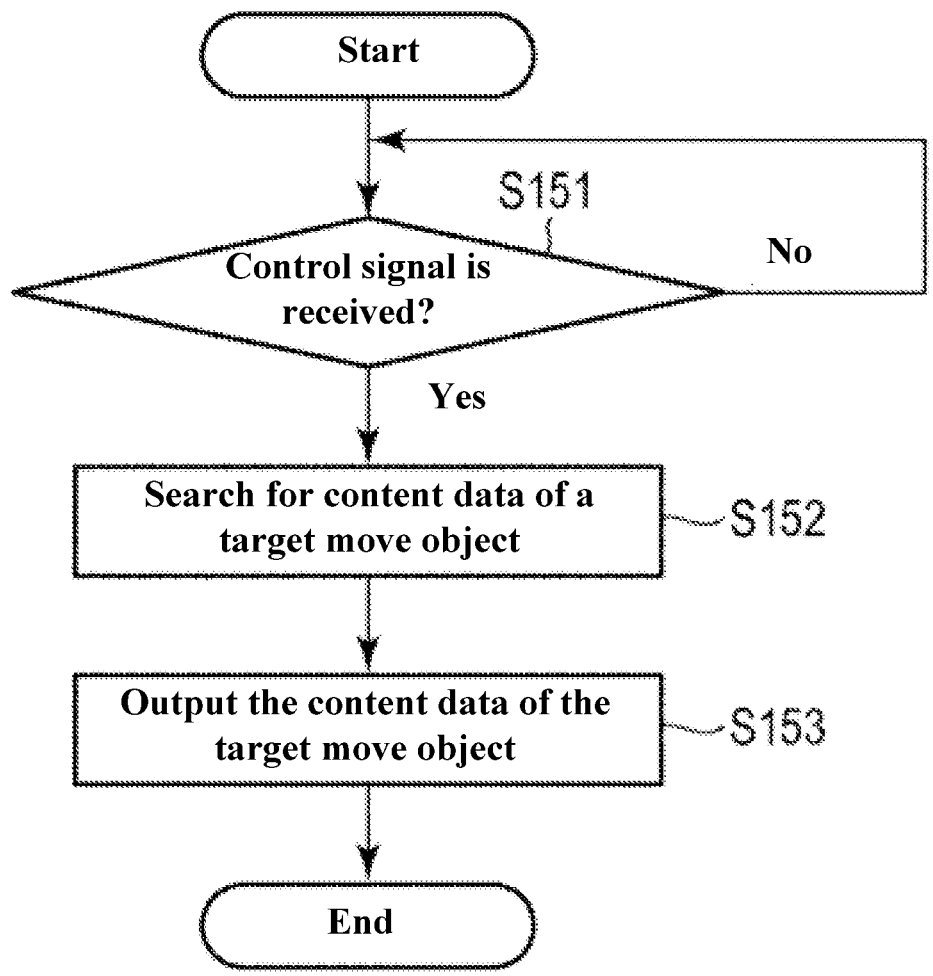
FIG. 7 is a flowchart showing an example of processing actions of the playback recording apparatus according to an embodiment.

FIG. 7 is a flowchart showing an example of processing actions of the playback recording apparatus according to an embodiment. When receiving the control signal of "skip 30−n seconds", the control unit 22 of the playback recording apparatus 2 retrieves and obtains the content data for 30−n seconds in the future from the storage unit 23 based on the correspondence between the logical address of the program data (content data) stored in the data management unit 24 on the storage unit 23 and the elapsed time from the start of the content data (Yes branch in step S151, and S152). The control unit 22 outputs the obtained content data for 30−n seconds in the future to the television receiving apparatus 1 (step S153). In the television receiving apparatus 1, the content data received from the playback recording apparatus 2 via the interface unit 18 is output to the prompt control unit 15, and is displayed to the user as content from the prompt unit 16.

In the above order, the playback recording apparatus 2 executes "skip 30−n seconds", and can perform the ideal "skip 30 seconds" shown in the time window T103 of FIG. 6A.

Furthermore, this embodiment describes an example where the pulse output from the voice data processing unit 191 and the pulse output from the command processing unit 194 are used as the count start timing and the reception timing of the command data, respectively. However, it may also use the timestamp as the moment information, instead of the pulse. For example, the time management unit 195 obtains the count value n as the difference between the moment of the start timing output by the voice data processing unit 191 and the moment of the reception timing of the command data output by the command processing unit 194.

FIG. 6B is a diagram showing an example of the control action based on a command "rewind 10 seconds", and the action of this embodiment will be described with reference to FIG. 5 and FIG. 7. Furthermore, the description of the same parts as those in FIG. 6A is omitted in FIG. 6B. Moreover, the description of the same parts as those in the case of FIG. 6A is also omitted in the process flows of FIG. 5 and FIG. 7.

If the user 7 outputs a voice command of "rewind 10 seconds" (equivalent to the time window T112), the time management unit 195 starts counting from the utterance end moment of the time window T112 (steps S101 to S103 in FIG. 5). The voice recognition process is performed. If the command processing unit 194 receives the command data, the time management unit 195 outputs the count value n (steps S103 to S105). The count value n is equivalent to the time of the time window T113. The time window T114 represents an example in the case when the voice command "rewind 10 seconds" of the user 7 is ideally executed. That is, it is desired to play the program from the moment of 10 seconds before the utterance end moment of the time window T112. However, the command "rewind 10 seconds" is actually executed from the end portion of the time window T113. Therefore, in this embodiment, the command control unit 196 generates a control signal as "rewind 10+n seconds" based on the command data of "rewind 10 seconds" and the count value n at the end moment of the time window T113 (step S106). The command control unit 196 outputs the generated control signal of "rewind 10+n seconds" to the external device, i.e., the playback recording apparatus 2 (step S107). The control unit 22 of the playback recording apparatus 2 receives and executes the control signal of "rewind 10+n seconds" (based on the flowchart of FIG. 7).

In the above order, the playback recording apparatus 2 executes "rewind 10+n seconds", and can thus perform the ideal "rewind 10 seconds" shown in the time window T114 of FIG. 6B.

Second Embodiment

This embodiment describes an example in the case when a method of generating a time shift instruction considering the processing time of the voice recognition of the voice data received from a user is applied to an instruction specifying a time window such as a preset chapter or scene.

The so-called "chapters" are segments (time windows) of the "main story" section and "CM" section in the case of dividing the program data (content data) into two sections: "main story" section and other section (for example, commercial message, etc., hereinafter referred to as "CM" section). In the conventional program, the "main story" section alternates with the "CM" section. The user selects a "chapter" by using the remote control or the like, to thereby immediately see a desired image.

In addition, the so-called "scene" is a time window in which the program data (content data) is divided according to content. For example, in a music program, when a time window is divided for each player, each time window is divided into a time window called "scene". The user selects a "scene" by using the remote control or the like, to thereby immediately see an image of a desired player.

As described above, the "chapter" and "scene" have different contents but the actions are the same in this embodiment, so the description will use "chapter" as an example. The voice command associated with "chapter" represents an example of using a command "skip a chapter" for playing a next chapter following the currently-viewed chapter or a command "rewind a chapter" for playing a previous chapter before the currently-viewed chapter.

Hereinafter, the actions of this embodiment will be described with reference to the drawings.

Figure 8A:
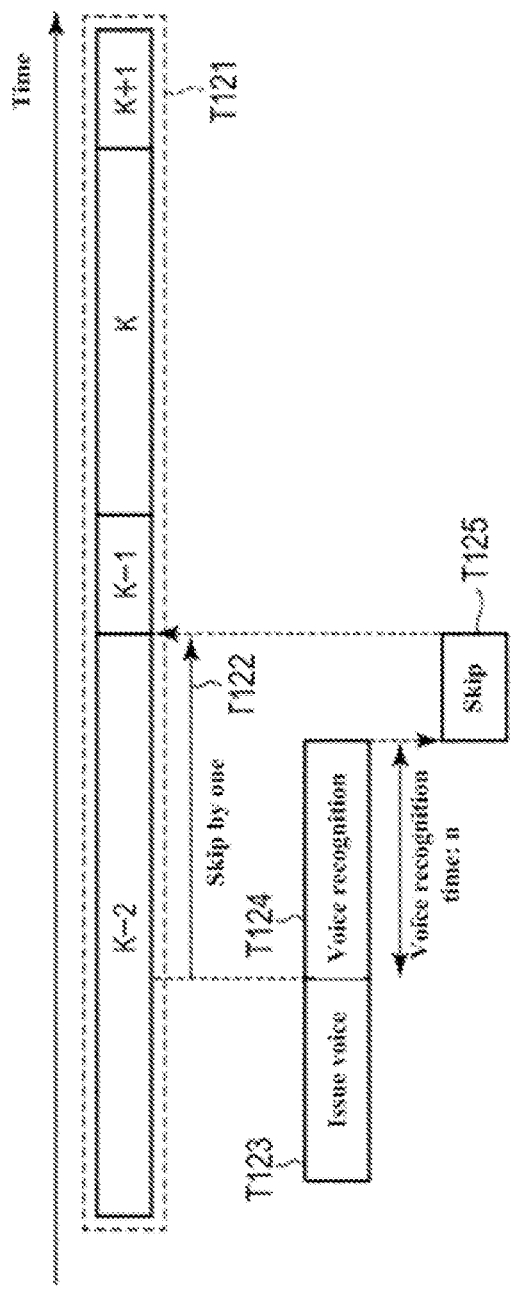
FIG. 8A and FIG. 8B are diagrams showing examples of a time relationship between a voice command and a control signal according to a second embodiment.
Figure 8B:
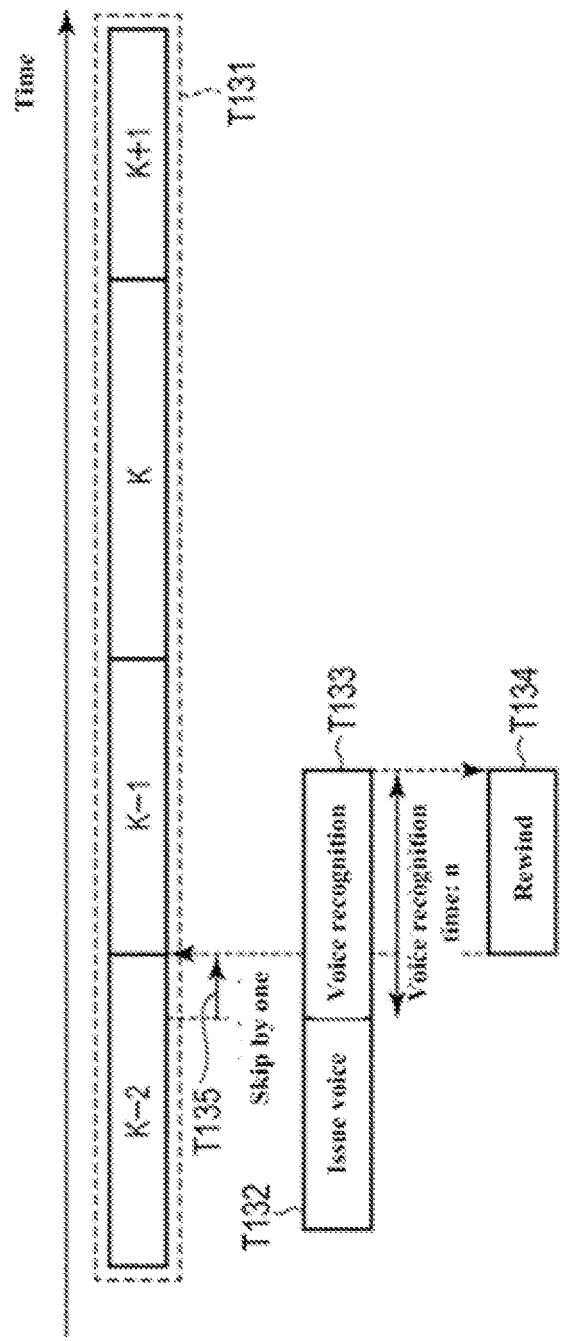

FIG. 8A and FIG. 8B are diagrams showing examples of a time relationship between a voice command and a control signal according to the second embodiment. FIG. 8A is a diagram illustrating the control action of the voice command processing unit 19 based on the command "skip a chapter", and the action will be described with reference to FIG. 5 and FIG. 9. Furthermore, the description of the same parts as those in FIG. 6A is omitted in FIG. 8A. Moreover, regarding the process flow shown in FIG. 5, the description of the same parts as those in the case shown in FIG. 6A is omitted.

The time window T121 shown in FIG. 8A represents an example of dividing a program into "chapters", where k−2, k−1, k, k+1 and numbers are assigned to the "chapters" in chronological order. For example, the chapters k−2 and k may be "main story" sections respectively, and the chapters k−1 and k+1 may be regarded as "CM" sections respectively. Furthermore, in the case when the "scene" is applied to the time window T121 of FIG. 8A, the "scenes" are respectively assigned to the time windows k−2, k−1, k and k+1. The user selects the scenes k−2, k−1, k and k+1, and decides the desired scene to watch.

If the user 7 speaks the voice command "skip a chapter" (equivalent to the time window T123), the time management unit 195 starts counting from the utterance end moment of the time window T123 (steps S101 to S103 in FIG. 5). The voice recognition process is executed. If the command processing unit 194 receives the command data, the time management unit 195 outputs the count value n (steps S103 to S105). The count value n is equivalent to the time length (seconds) of the time window T124. The time window T122 represents an example in the case when the voice command "skip a chapter" from the user 7 is ideally executed. That is, it is desired to play the program from the chapter k−1 that skips one chapter from the chapter k−2 at the utterance end moment of the time window T123. In the embodiment shown in FIG. 8A, the end moment of the time window T124 is included in the chapter k−2 in the same way as the utterance end moment of the time window T123, so the ideal control is also performed as in the time window T122 even if "skip a chapter" is executed at the end moment of the time window T124. However, in this embodiment, the voice command processing unit 19 does not have such information as to how the time window T121 is divided into chapters. Usually, such information is stored in the data management unit 24 of the playback recording apparatus 2. Therefore, for example, the command control unit 196 generates a control signal including both the command data of "skip a chapter" and the count value n at the end moment of the time window T124 (step S106). The command control unit 196 outputs the control signal including "skip a chapter" and "count value n" to the external device, i.e., the playback recording apparatus 2 (step S107).

Figure 9:
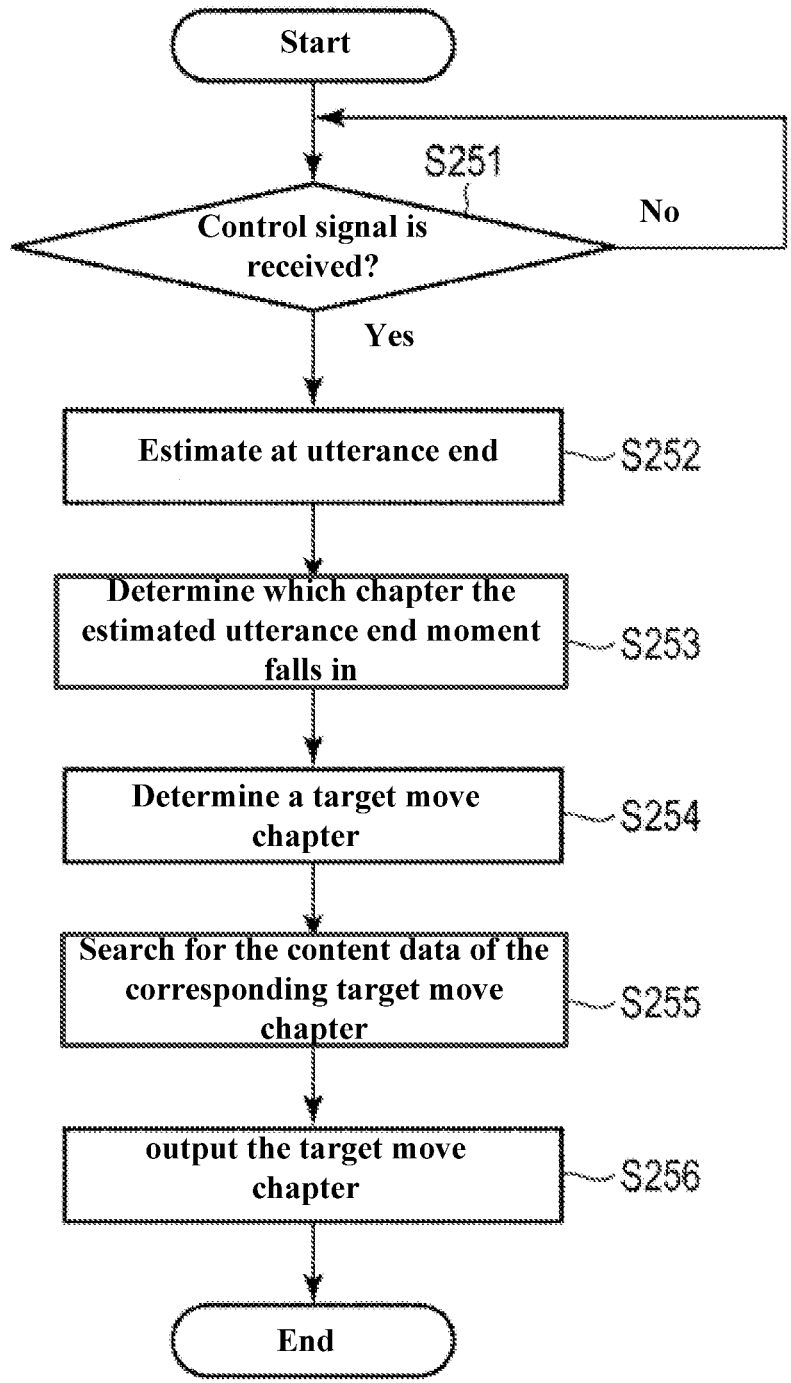
FIG. 9 is a flowchart showing an example of processing actions of the playback recording apparatus according to an embodiment.

FIG. 9 is a flowchart showing an example of processing actions of the playback recording apparatus according to this embodiment. The control unit 22 of the playback recording apparatus 2 estimates the utterance end moment of the command "skip a chapter" (equivalent to the end moment of the time window T123 in FIG. 8A) at the timing (set as moment TR) at which the control signal including "skip a chapter" and "count value n" is received (step S252). In some embodiments, the moment obtained by subtracting the count value n from the moment TR is set as the utterance end moment. Next, the control unit 22 determines which chapter the estimated utterance end moment falls in (step S253). In some embodiments, the control unit 22 can use the correspondence between the logical address of each chapter set for the program data (content data) stored in the data management unit 24 on the storage unit 23 and the elapsed time from the start of the content data, so as to determine which chapter the estimated utterance end moment falls in. The control unit 22 determines a target move chapter according to the chapter where the estimated utterance end moment falls and the "skip a chapter" instruction included in the control signal (step S254). Taking FIG. 8A as an example for illustration, the chapter k−2 is estimated as the chapter including the utterance end moment, and the previous chapter before the chapter k−2 becomes a target move chapter according to the command "skip a chapter", so the control unit 22 determines the chapter k−1 as the target move chapter. The time window T125 represents the movement from the end moment of the time window T124 to the start moment of the target move chapter k−1. The control unit 22 searches for the content data of the corresponding target move chapter from the storage unit 23 based on the correspondence stored in the data management unit 24 (step S255). The control unit 22 outputs the searched content data to the television receiving apparatus 1 from the start of the target move chapter (step S256). In the television receiving apparatus 1, the content data received from the playback recording apparatus 2 via the interface unit 18 is output to the prompt control unit 15, and is displayed to the user as content from the prompt unit 16.

In the above order, the user 7 issues "skip a chapter", so that the ideal "skip chapter" shown in the time window T122 of FIG. 8A can be performed.

Next, an example of another action in this embodiment will be described. This example is an example in the case when the chapter at the end of the user's utterance of the voice command is different from the chapter at the time when the command control unit 196 obtains the command data during the execution of the command "skip a chapter".

FIG. 8B is a diagram illustrating an example of the control action of the voice command processing unit 19 based on the command "skip a chapter", and the action will be described with reference to FIG. 5 and FIG. 9. Furthermore, the description of the same parts as those in FIG. 8A is omitted in the description of FIG. 8B.

In FIG. 8B, the utterance end moment of the voice command "skip a chapter" (equivalent to the time window T132) issued from the user 7 falls within the chapter k−2, the voice command is processed, and the timing (equivalent to the end moment of the time window T133) at which the command processing unit 194 receives the command data falls within the chapter k−1. The time management unit 195 outputs the count value n of the time window T133 (steps S101 to S105 in FIG. 5). The count value n is equivalent to the time length (seconds) of the time window T133. The time window T135 represents an example in the case when the voice command "skip a chapter" from the user 7 is ideally executed. That is, it is desired to play the program from the chapter k−1 that skips one chapter from the chapter k−2 at the utterance end moment of the time window T132. However, in the embodiment of FIG. 8B, the end moment of the time window T133 falls within the next chapter k−1 after the chapter k−2 at the utterance end moment of the time window T132, so the control is executed to play the program from the chapter k next to the chapter k−1 in the case when "skip a chapter" is executed at the end moment of the time window T133. In this embodiment, the command control unit 196 generates a control signal including both the command data of "skip a chapter" and the count value n at the end moment of the time window T133 (step S106). The command control unit 196 outputs the control signal including "skip a chapter" and "count value n" to the external device, i.e., the playback recording apparatus 2 (step S107).

The control unit 22 of the playback recording apparatus 2 estimates the utterance end moment of the command "skip a chapter" from the user 7 (equivalent to the end moment of the time window T132 in FIG. 8B) at the timing (set as moment TR) at which the control signal including "skip a chapter" and "count value n" is received (step S252 in FIG. 9). In some embodiments, the moment obtained by subtracting the count value n from the moment TR is set as the utterance end moment. Next, the control unit 22 determines which chapter the estimated utterance end moment falls in (step S253).

The control unit 22 determines a target move chapter according to the chapter including the estimated utterance end moment and the "skip a chapter" instruction included in the control signal (step S254). In the example of FIG. 8B, the chapter k−2 is estimated as the chapter including the utterance end moment, and a previous chapter immediately before the chapter k−2 becomes the target move chapter through the command "skip a chapter", so the control unit 22 determines the chapter k−1 as the target move chapter. The time window T134 represents the movement from the end moment of the time window T133 to the start moment of the target move chapter k−1. The control unit 22 searches for the content data of the corresponding target move chapter from the storage unit 23 based on the correspondence stored in the data management unit 24 (step S255). The control unit 22 outputs the searched content data to the television receiving apparatus 1 from the start of the target move chapter (step S256). In the television receiving apparatus 1, the content data received from the playback recording apparatus 2 via the interface unit 18 is output to the prompt control unit 15, and is displayed to the user as content from the prompt unit 16.

In the above order, the user 7 speaks "skip a chapter", so that the ideal "skip chapter" shown in the time window T135 of FIG. 8B can be performed.

Next, an example of the actions in the case of command "rewind a chapter" in this embodiment will be described.

Figure 10A:
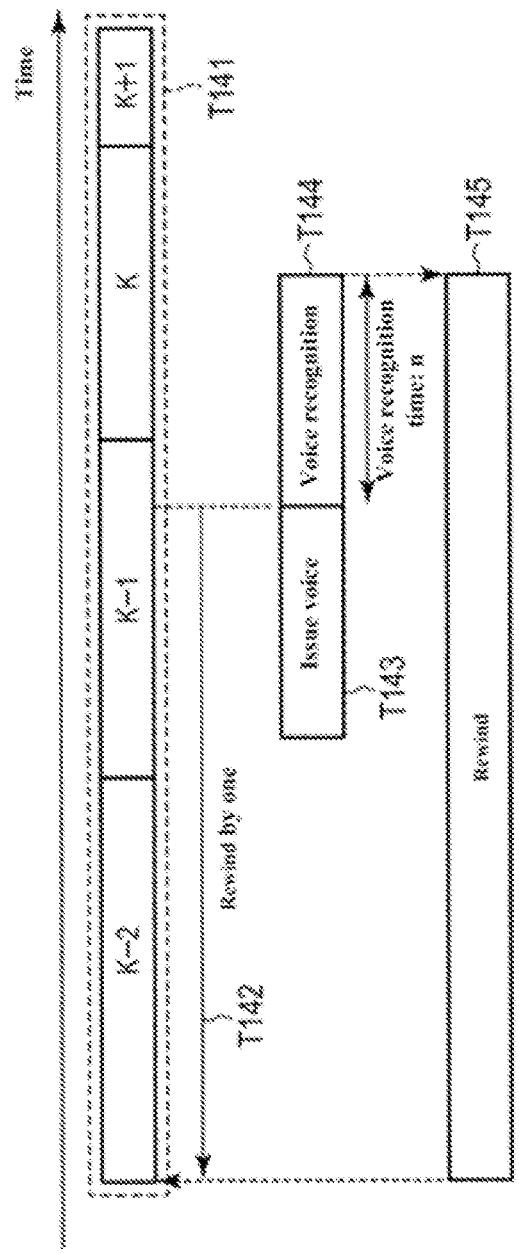
FIG. 10A and FIG. 10B are diagrams showing examples of a time relationship between a voice command and a control signal according to an embodiment.
Figure 10B:
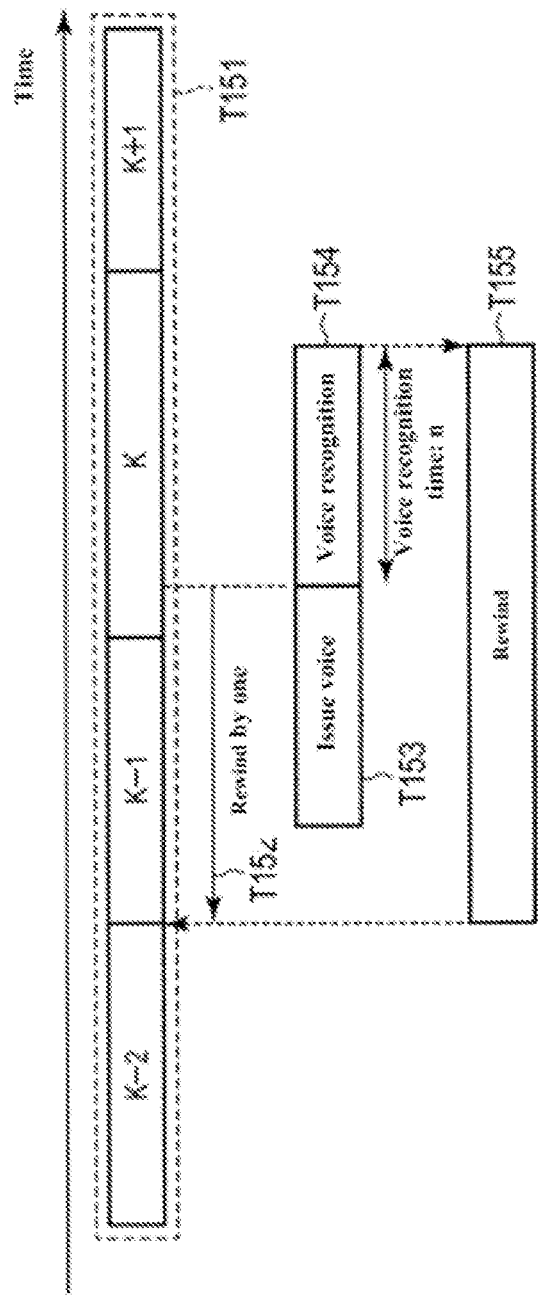

FIG. 10A and FIG. 10B are diagrams showing examples of a time relationship between a voice command and a control signal according to an embodiment, and is an example in the case of command "rewind a chapter".

This action will be described with reference to FIG. 5 and FIG. 9. Furthermore, the description of the same parts as those in FIG. 8A and FIG. 8B is omitted in the description of FIG. 10A and FIG. 10B.

FIG. 10A is a diagram illustrating an example of a control action of the voice command processing unit 19 based on the command "rewind a chapter", which is an example in the case where the chapter at the utterance end of the user's voice command is different from the chapter at the time when the command control unit 196 obtains the command data.

In FIG. 10A, the utterance end moment of the voice command "rewind a chapter" (equivalent to the time window T143) issued from the user 7 falls within the chapter k−1, the voice command is processed, and the timing (equivalent to the end moment of the time window T144) at which the command processing unit 194 receives the command data falls within the chapter k. The time management unit 195 outputs the count value n of the time window T144 (steps S101 to S105 in FIG. 5). The count value n is equivalent to the time length (seconds) of the time window T144. The time window T142 represents an example in the case when the voice command "rewind a chapter" of the user 7 is ideally executed. That is, it is desired to play the program from the chapter k−2 that is the previous chapter of the chapter k−1 at the utterance end moment of the time window T143. However, in the embodiment of FIG. 10A, the end moment of the time window T144 is included in the next chapter k of the chapter k−1 at the utterance end moment of the time window T143, so the control is executed to play the program from the previous chapter k−1 of the chapter k in the case when "rewind a chapter" is executed at the end moment of the time window T144. In this embodiment, the command control unit 196 generates a control signal including both the command data of "rewind a chapter" and the count value n at the end moment of the time window T144 (step S106). The command control unit 196 outputs the control signal including "rewind a chapter" and "count value n" to the external device, i.e., the playback recording apparatus 2 (step S107).

The control unit 22 of the playback recording apparatus 2 estimates the utterance end moment of the command "rewind a chapter" from the user 7 (equivalent to the end moment of the time window T143 in FIG. 10A) at the timing (set as moment TR) at which the control signal including "rewind a chapter" and "count value n" is received (step S252 in FIG. 9). In some embodiments, the moment obtained by subtracting the count value n from the moment TR is set as the utterance end moment. Next, the control unit 22 determines which chapter the estimated utterance end moment falls in (step S253).

The control unit 22 determines a target move chapter according to the chapter where the estimated utterance end moment falls in and the "rewind a chapter" included in the control signal (step S254). In the example of FIG. 10A, the chapter k-1 is estimated as the chapter including the utterance end moment, the previous chapter from the chapter k-1 becomes the target move chapter through the command "rewind a chapter", and the control unit 22 determines the chapter k-2 as the target move chapter. The time window T145 represents the movement from the end moment of the time window T144 to the start moment of the target move chapter k-2. The control unit 22 searches for the content data of the corresponding target movet chapter from the storage unit 23 based on the correspondence stored in the data management unit 24 (step S255). The control unit 22 outputs the searched content data to the television receiving apparatus 1 from the start of the target move chapter (step S256).

In the above order, the user 7 speaks "rewind a chapter", so that the ideal "rewind a chapter" shown in the time window T142 of FIG. 10A can be performed.

FIG. 10B is a diagram illustrating an example of another control action of the voice command processing unit 19 based on the command "rewind a chapter", which is an example in the case when the chapter at the utterance end of the user's voice command is the same as the chapter at the time when the command control unit 196 obtains the command data. The processing action in this case is the same as that in the case of FIG. 10A, so the description is omitted. When the user 7 speaks "rewind a chapter", the ideal "rewind a chapter" shown in the time window T152 of FIG. 10B can be performed according to the processing flows of FIG. 5 and FIG. 9.

Third Embodiment

In this embodiment, an example where the processing time of voice recognition of the voice data received from a user is predetermined as a fixed value and a time shift instruction is generated will be described.

Figure 11A:
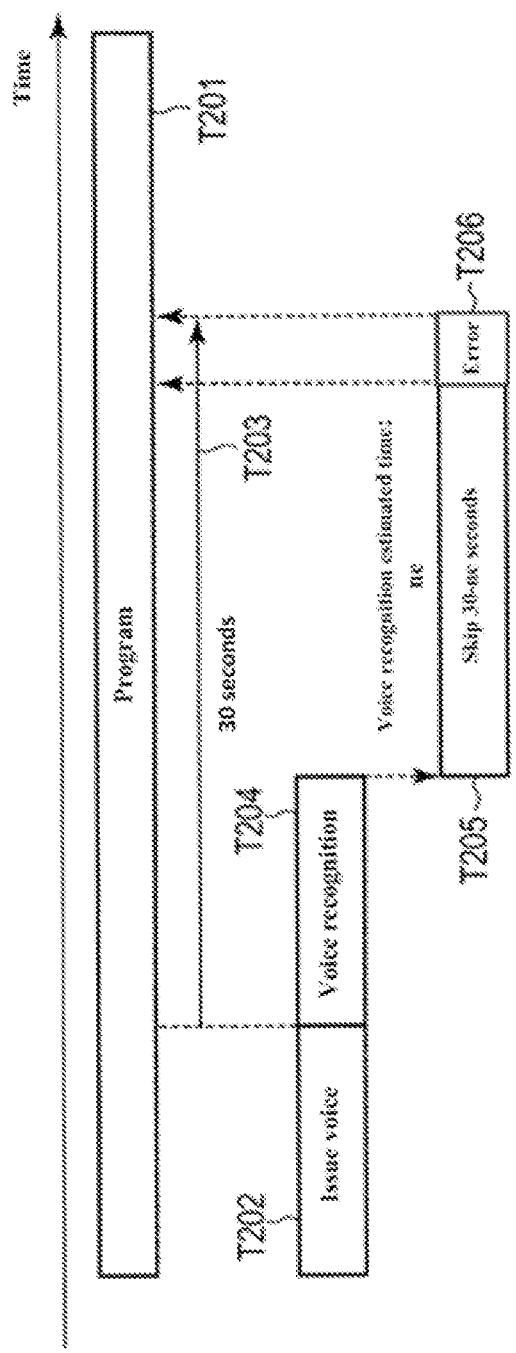
FIG. 11A and FIG. 11B are diagrams showing examples of a time relationship between a voice command and a control signal according to a third embodiment.
Figure 11B:
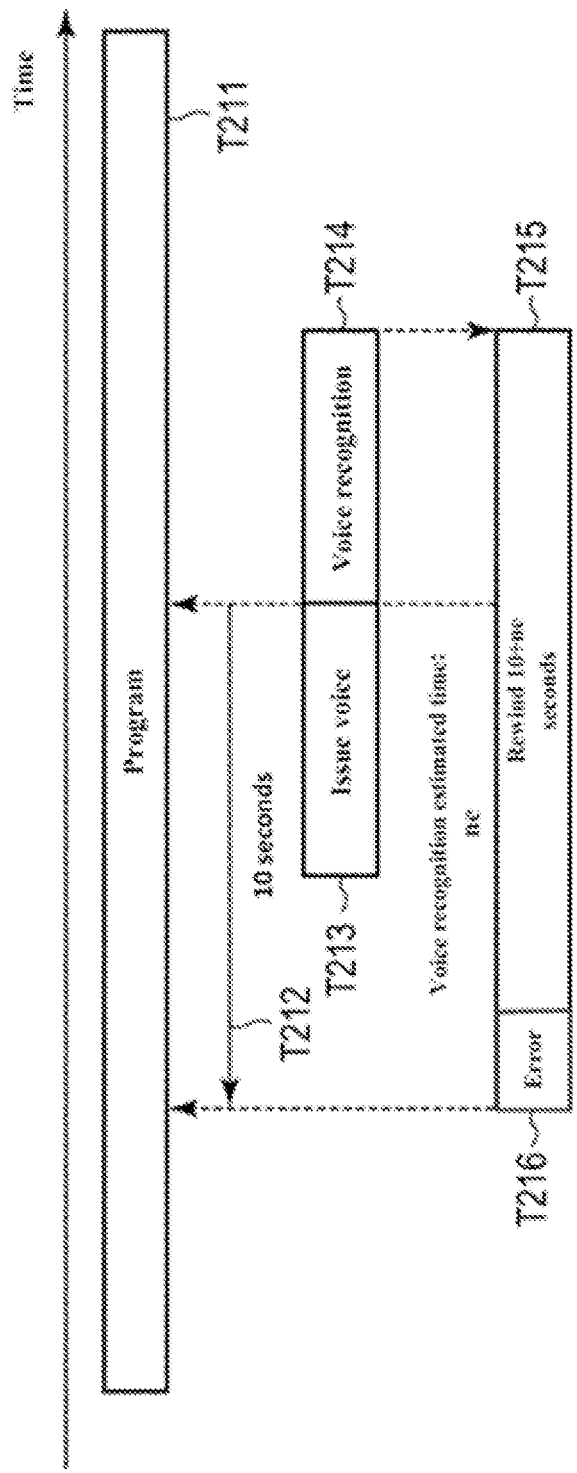

FIG. 11A and FIG. 11B are diagrams showing examples of a time relationship between a voice command and a control signal according to the third embodiment, FIG. 11A shows an example of a command "skip 30 seconds", and FIG. 11B shows an example of a command "rewind 10 seconds". In the examples of FIGS. 6(a) and (b) in the first embodiment, the time management unit 195 counts the time length of the time window T104, that is, the voice recognition time n. However, in the cases of the examples of FIGS. 11(a) and (b) in this embodiment, the voice recognition time n is set as a value estimated and set in advance. In this embodiment, the estimated voice recognition time n is referred to as the voice recognition estimated time ne. Firstly, with respect to the example of FIG. 11A, an example of processing actions will be described using a flowchart.

Figure 12:
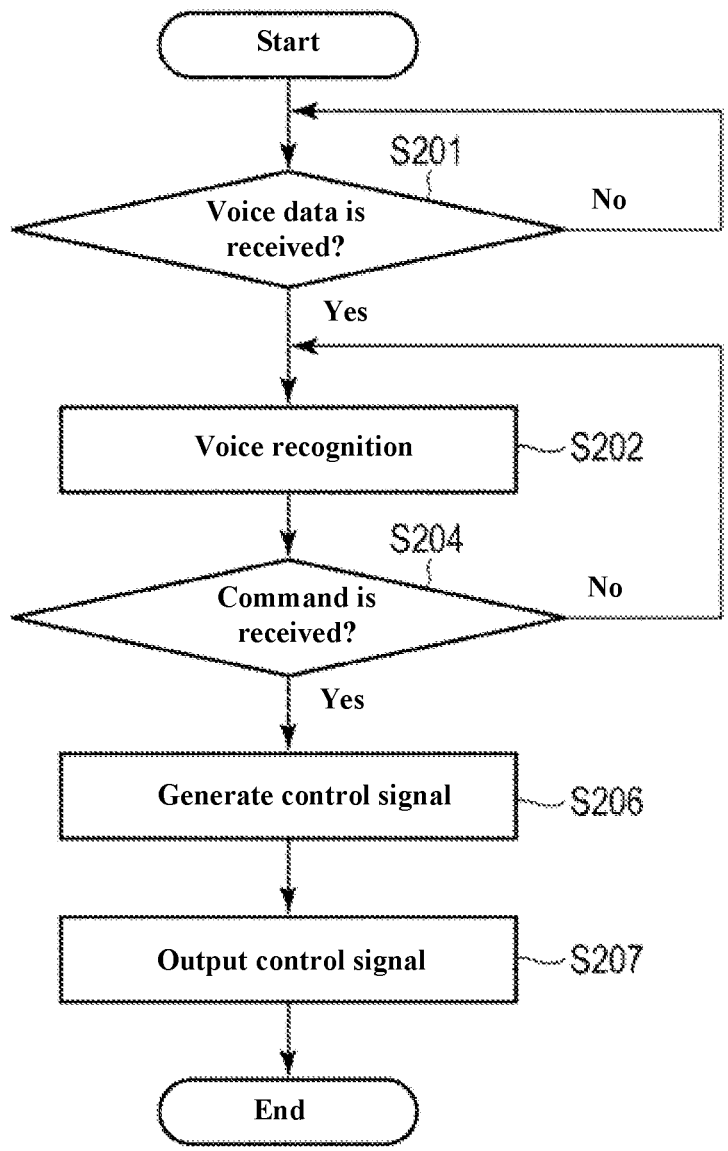
FIG. 12 is a flowchart showing an example of processing actions of the voice command processing unit according to an embodiment.

FIG. 12 is a flowchart showing an example of processing actions of the voice command processing unit according to an embodiment, which is the same as the flowchart in which steps S103 and S105 are removed from the flowchart of FIG. 5 in the first embodiment. The description of the same parts as those in FIG. 5 is omitted.

If the user 7 speaks a voice command "skip 30 seconds" (equivalent to the time window T202 in FIG. 11A), the voice recognition processing is executed from the utterance end moment of the time window T202 (steps S201 to S202). Upon receiving the command data, the command processing unit 194 outputs the command data to the command control unit 196. Also, at the same time, the command control unit 196 obtains the voice recognition estimated time ne from the time management unit 195. In addition, the voice recognition estimated time ne may also be preset in the command control unit 196. The command control unit 196 generates a control signal based on the command data and the voice recognition estimated time ne (Yes in step S204, and S206). In some embodiments, if the command data is "skip 30 seconds", the command control unit 196 subtracts the voice recognition estimated time ne from 30 seconds to generate a control signal as "skip 30-ne seconds". The command control unit 196 outputs the generated control signal of "skip 30-ne seconds" to the external device, i.e., the playback recording apparatus 2 (step S207). The control unit 22 of the playback recording apparatus 2 receives and executes the control signal of "skip 30-ne seconds" (based on the flowchart of FIG. 7).

The time window T203 of FIG. 11A describes an example in the case when the voice command of "skip 30 seconds" from the user 7 is ideally executed, where the target of the arrow indicates the moment of the target move content data. In this embodiment, the control unit 22 of the playback recording apparatus 2 executes "skip 30-ne seconds". The time window T205 represents the amount of movement based on "skip 30-ne seconds". However, the time difference shown by the time window T206 occurs between the moment of the target move content shown in the time window T203 and the moment of target move content based on the time window T205. This is because ne is an estimated value of the voice recognition time. In this embodiment, the time error of the time window T206 is allowed, and the time shift instruction can be easily approximated to the ideal action. Moreover, the precision of the voice recognition estimated time ne is improved by averaging the voice recognition estimated time ne, etc., so that the precision of the time shift instruction is further improved.

In the above order, the playback recording apparatus 2 executes "skip 30-ne seconds", and can thus perform the ideal "skip 30 seconds" shown in the time window T203 of FIG. 11A.

Moreover, for the case of "rewind 10 seconds" in FIG. 11B, similarly to the case of the example in FIG. 11A, the time error of the time window T216 is allowed, and the time shift instruction can be easily approximated to the ideal action (time window T212).

Fourth Embodiment

The first embodiment shows the example where the command control unit 196 generates the control signal of "skip 30-n seconds" considering the voice recognition time n as shown in FIG. 6A and FIG. 6B. This embodiment illustrates an example of generating a time shift instruction considering not only the processing time of voice recognition of the voice data (voice recognition time n) but also the time length of the voice command spoken by the user.

Hereinafter, the actions of this embodiment will be described with reference to the drawings.

Figure 13A:
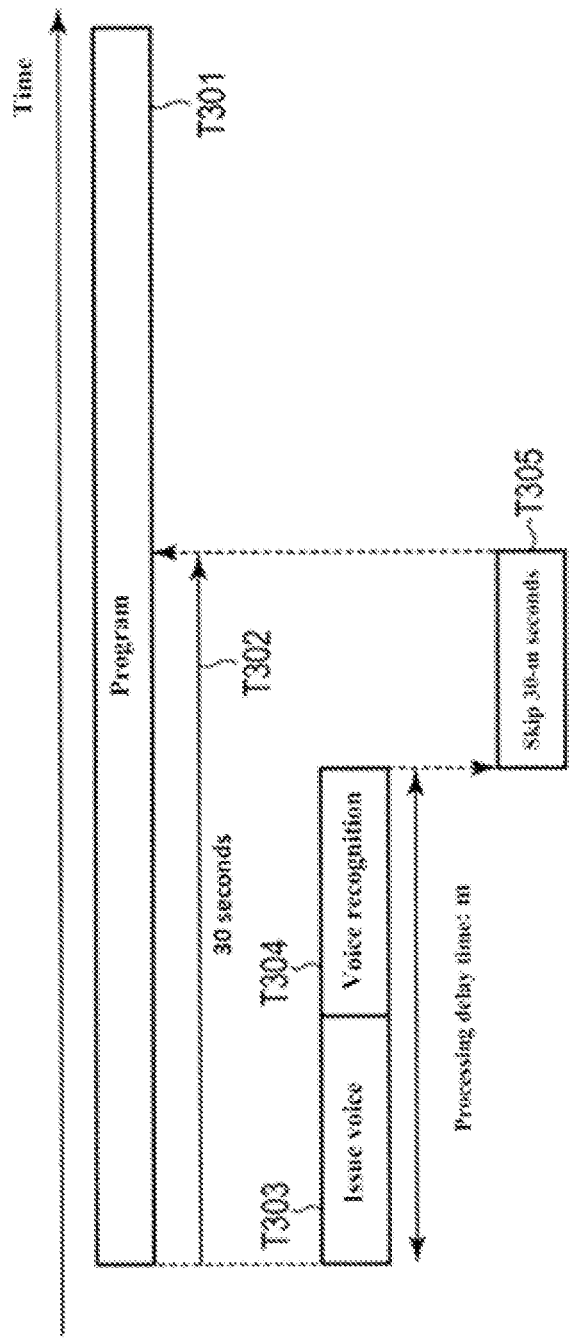
FIG. 13A and FIG. 13B are diagrams showing examples of a time relationship between a voice command and a control signal according to a fourth embodiment.
Figure 13B:
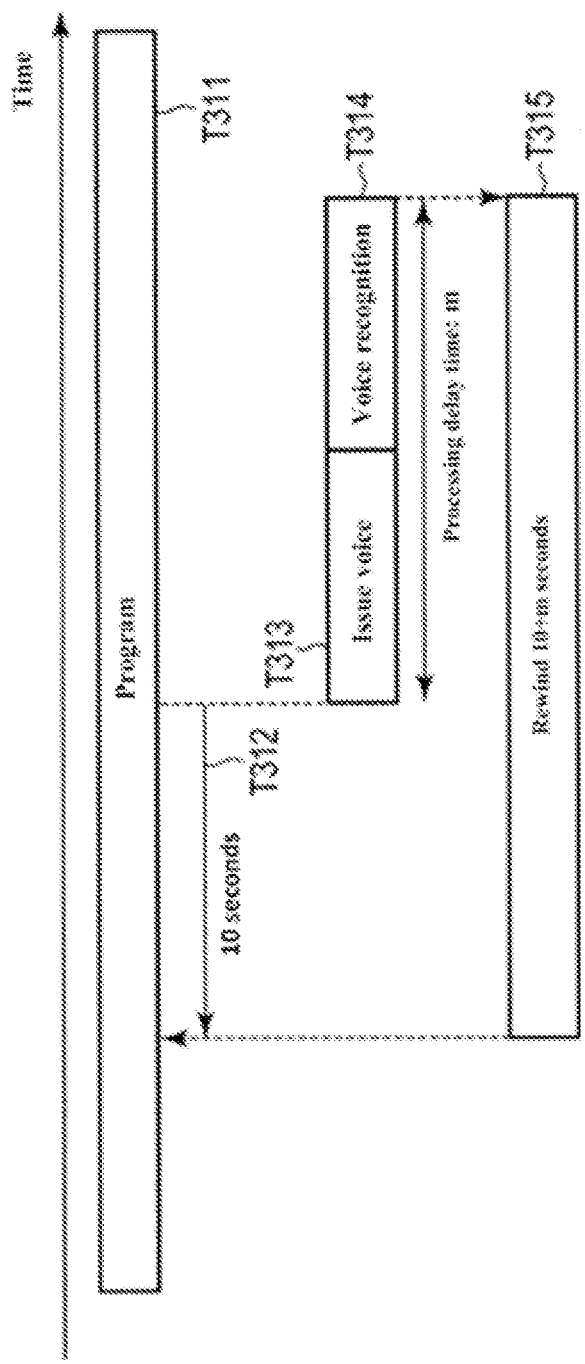

FIG. 13A and FIG. 13B are diagrams showing examples of a time relationship between a voice command and a control signal according to the fourth embodiment, FIG.

13A shows an example of a command "skip 30 seconds", and FIG. 13B shows an example of a command "rewind 10 seconds".

In this embodiment, for example, as shown in FIG. 13A, the processing delay time m being the time length of the time window T304 (i.e., the voice recognition time n) plus the utterance time of the voice command issued by the user (equivalent to the time window T303) is used during generation of the control signal. The processing actions of FIGS. 13(a) and (b) are the same, so the processing actions in the case of the example of FIG. 13A will be described below using a flowchart.

Figure 14:
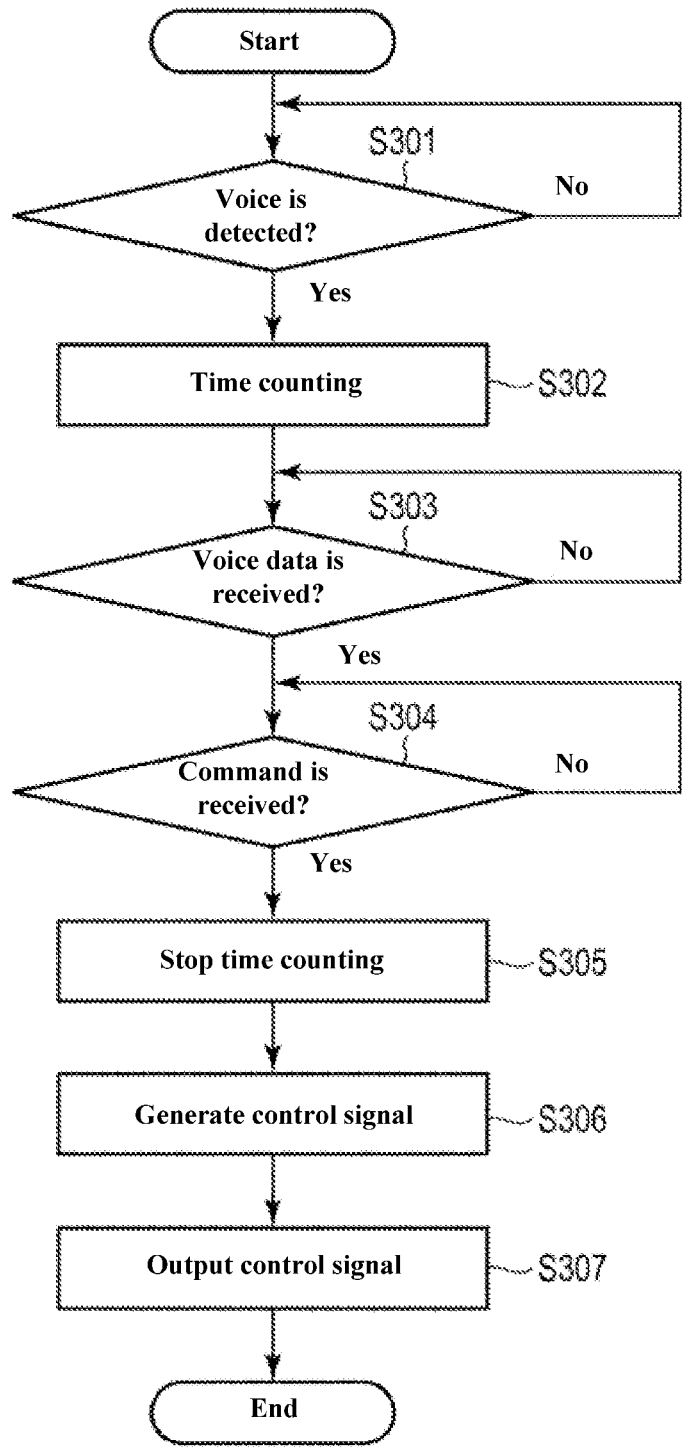
FIG. 14 is a flowchart showing an example of processing actions of the voice command processing unit according to an embodiment.

FIG. 14 is a flowchart showing an example of processing actions of the voice command processing unit according to this embodiment.

The voice "skip 30 seconds" uttered by the user 7 is collected by the microphone in the interface unit 18 of the television receiving apparatus 1, gone through the AD-DA conversion and the like, and then input to the voice data processing unit 191 as voice data.

The voice data processing unit 191 monitors the input level or the like of the input voice data, and outputs the voice input timing to the time management unit 195 when detecting the timing from the non-voice state to a voice state (referred to as voice input timing). The time management unit 195 starts counting with the voice input timing as a trigger (steps S301 and S302). Furthermore, as also shown in the first embodiment, the voice input timing may be a pulse or a moment such as a timestamp. In this embodiment, a pulse is shown as an example. The voice data processing unit 191 monitors the no voice period and the voice period of the input voice data, determines that a certain piece of voice data is received if a voice period is detected, and outputs the voice data to the voice recognition server 3 for voice recognition processing, language recognition processing, etc. (Yes branch in step S303). If the command processing unit 194 receives the command data, it outputs a pulse for indicating the reception timing of the command data to the time management unit 195 and outputs the command data to the command control unit 196 (Yes branch in step S304). If the time management unit 195 receives the pulse for indicating the reception timing of the command data, it stops time counting and outputs a count value (step S305). The count value output by the time management unit 195 is the difference between the voice input timing received from the voice data processing unit 191 and the reception timing of the command data received from the command processing unit 194, and is equivalent to the processing delay time m shown in FIG. 13A and FIG. 13B. The command control unit 196 generates a control signal based on the command data output from the command processing unit 194 and the processing delay time m output from the time management unit 195, and outputs the generated control signal. In some embodiments, when receiving the command "skip 30 seconds" as the command data, the command control unit 196 generates a control signal of "skip 30−m seconds" by subtracting the processing delay time m from 30 seconds (step S306). The command control unit 196 outputs the generated control signal of "skip 30−m seconds" to the external device, i.e., the playback recording apparatus 2 (step S307). The processing in the playback recording apparatus 2 is the same as that in FIG. 7, so the description is omitted.

In the above order, the playback recording apparatus 2 executes "skip 30−m seconds", and can perform the ideal "skip 30 seconds" shown in the time window T302 of FIG. 13A, that is, move to the content data after 30 seconds from the voice command "skip 30 seconds" spoken by the user.

According to this embodiment, the content data can be skipped based on the timing at which the user 7 considers the content he wants to skip and speaks a command.

Furthermore, in the example of FIG. 13B, also similar to the case shown in FIG. 13A, the control of the playback recording apparatus 2 based on the time shift command "rewind 10 seconds" considering the utterance time of the command from the user 7 can be performed. In addition, this embodiment can also be applied to the case of moving a "chapter" or "scene" shown in the second embodiment.

Variant Example 1

For example, the first to third embodiments can also be applied when the time shift commands such as "skip 30 seconds", "rewind 10 seconds", "skip a chapter" and "rewind a chapter" as shown in the first to third embodiments are repeated multiple times. The case of repeating multiple times is, for example, repeating "skip 30 seconds" twice to skip 60 seconds. The voice command in such case may be, for example, "skip 30 seconds 3 times", "rewind 10 seconds 4 times", "skip a chapter 3 times", "rewind a chapter 5 times", etc. The operation times of the command is set in the voice commands Here, a command that is executed multiple times in this way is called multiple-times command Correspondingly, the commands such as "skip 30 seconds", "rewind 10 seconds", "skip chapter", "rewind a chapter", etc. illustrated in the first to third embodiments are called single commands.

The adjustment parameters (voice recognition time n, processing delay time m) for multiple-times commands and the control signals for playback recording apparatus 2 can be generated in the same manner as single commands by using the flowcharts shown in the first to third embodiments. In the playback recording apparatus 2, the content data and chapter of the target move content are determined according to the received multiple-times command and adjustment parameters, so that the multiple-times command can be executed considering the voice recognition time n and the processing delay time m. For example, in the case of "skip 30 seconds 3 times", the playback recording apparatus 2 uses the adjustment parameters from the reception timing (moment TR) of the control signal to obtain the sending moment of the multiple-times command "skip 30 seconds 3 times" from the user. The playback recording apparatus 2 determines the content data that skips 30 seconds 3 times, that is, the content data at the moment of t0+90 seconds, as the content data of the target move content, on the basis of the obtained sending moment (set as moment t0) of the multiple-times command Here, if the moment t0 is set as the sending moment of the multiple-times command, the processing delay time m is taken into account for the time shift command; if the moment t0 is set as the sending end moment of the multiple-times command, the voice recognition time n is taken into account for the time shift command.

In the above order, it may also execute the time shift command with higher accuracy considering the voice recognition time n and the processing delay time m for the time shift command such as multiple-times command.

In addition, as a case similar to the multiple-times command, it may continuously issue a single command. For example, taking a single command "skip 30 seconds" as an example, it is a case of continuous single command such as "skip 30 seconds, skip 30 seconds, skip 30 seconds". In such a case, it can also be regarded as saying a command "skip 30 seconds" once for action. For example, when the same command data "skip 30 seconds" is continuously received in the command processing unit 194, the command data "skip 30 seconds" received for the second time and subsequent times is not output to the command control unit 196. The reception moment of the command data "skip 30 seconds" for the first time may also be used in such way to calculate the adjustment parameters (voice recognition time n, processing delay time m).

In addition, the above sequence can also be applied to skipping and rewind of a chapter and a scene, etc.

Variant Example 2

The above embodiments describe the examples in the case when the voice recognition server 3 is used for the voice recognition function and the language processing server 4 is used for the language recognition function, but the case where the television receiving apparatus 1 has the voice recognition function and the language recognition function also falls within the scope of the disclosure. In this case, the television receiving apparatus 1 does not need communication via the network 5, so the processing time for the voice recognition function and the language recognition function is reduced, and the fluctuation of the processing time based on the communication via the network 5 is also reduced. For example, there is an effect of improving the estimation accuracy of the voice recognition estimated time ne described in the third embodiment.

Variant Example 3

The above embodiments illustrates the examples where the voice command processing unit 19 is included in the television receiving apparatus 1, but the functions of the voice command processor 19 may be separated from the television receiving apparatus 1 and set as an independent voice command processing device (not shown in the figure). For example, the voice command processing device may include an interface unit (not shown) corresponding to the interface unit 18 to communicate with the television receiving apparatus 1. In addition, the voice command processing device may also be provided on the network 5 and communicate with the television receiving apparatus 1 via the communication unit 13. In addition, the voice command processing device may also use the voice recognition server 3 and the language processing server 4 on the network 5 to realize the voice recognition function and the language recognition function, or the voice recognition function and the language recognition function may be included inside the voice command processing device.

Variant Example 4

The functions of the voice command processing unit 19 may be provided in the remote controller 6 of the television receiving apparatus 1. For example, if a user speaks a voice command to the microphone of the remote controller 6, the remote controller 6 may also generate a control signal and output the generated control signal to the interface unit 18 of the television receiving apparatus 1. The remote controller 6 may also have the voice recognition function and language recognition function internally, or may use the external voice recognition function and language recognition function.

According to at least one of the above-described embodiments, a control signal generation circuit that reduces the influence of control delay in the voice recognition control, various devices (voice command processing device, television receiving apparatus, remote controller with microphone) using the control signal generation circuit, a controlled device (playback recording apparatus) that can be controlled by a control signal generated by the control signal generation circuit, various systems using the control signal generation circuit, a control signal generation method and a non-transitory storage medium can be provided.

Although several embodiments of the disclosure have been described, these embodiments are presented as examples but not intended to limit the scope of the disclosure. These new embodiments can be implemented in other various forms, and various omissions, substitutions and changes can be made without departing from the scope of the substance of the disclosure. These embodiments and variants thereof are included in the scope and substance of the disclosure, and are included in the disclosure described in the claims and the equivalents thereof. Further, in the structural elements of the claims, the cases when the structural elements are expressed separately or when the structural elements are expressed in combination or both also fall within the scope of the disclosure. Moreover, a plurality of embodiments may also be combined.

What is claimed is:
1. A television receiving apparatus, comprising:
a broadcast signal receiving and processing unit configured to process broadcast signals according to broadcast standards;
a communication unit configured to connect with a network and communicate with one or more servers and one or more external devices;
a monitor configured to display an image;
a speaker configured to output voice;
a microphone configured to receive a voice input;
an interface unit configured to receive a command signal from outside or output a signal to an external device;
a control unit in connection with the interface unit, the communication unit, the monitor, the speaker, the broadcast signal receiving and processing unit and configured to:
detect a voice input to the microphone based on voice data input via the interface unit;
in response to a voice period over a first period of time with voice input being detected, determine that a first piece of voice data in the voice period is received;
send a first time point of the voice period as a trigger signal of the first piece of voice data, wherein the first time point of the voice period is a start time point or an end time point of the voice period;
send the first piece of voice data for voice recognition and language processing;
obtain a second time point associated with first command data corresponding to the first piece of voice data, wherein the first command data is a command content generated after the voice recognition and language processing;
generate a first control signal for a target controlled object based on the command data and a delay time associated with a difference between the first time point of the voice period and the second time point associated with the first command data;
send the first control signal to the target controlled object to implement a control operation corresponding to the first piece of voice data.

2. The television receiving apparatus according to claim 1, wherein the command data comprises a command for moving program content forward or backward a period of time once.

3. The television receiving apparatus according to claim 1, wherein the command data is a command for time shifting to a particular chapter or scene of program content.

4. The television receiving apparatus according to claim 3, wherein the target controlled object comprises an external device which is capable of connecting with the television receiving apparatus via the interface unit.

5. The television receiving apparatus according to claim 4, wherein the control unit is further configured to:
receive content data of a target move chapter from the external device, wherein the target move chapter is determined based on the first control signal by determining whether the first time point of the voice period and the second time point associated with the first command data both fall within a same chapter of the program content.

6. The television receiving apparatus according to claim 3, wherein the program content comprises a plurality of chapters or scenes, and the particular chapter or scene of program content has a time duration different from another chapter or scene in the plurality of chapters or scenes.

7. The television receiving apparatus according to claim 1, wherein the delay time associated with the difference between the first time point of the voice period and the second time point associated with the first command data comprises a duration of the voice recognition and language processing.

8. The television receiving apparatus according to claim 1, wherein the delay time associated with the difference between the first time point of the voice period and the second time point associated with the first command data comprises a sum of a duration of the voice period and a duration of the voice recognition and language processing.

9. The television receiving apparatus according to claim 1, wherein the delay time is predetermined as a fixed value.

10. The television receiving apparatus according to claim 1, wherein the command data comprises a command for moving program content forward or backward a period of time multiple times.

11. The television receiving apparatus according to claim 1, wherein the voice input is input to the microphone via a remote controller of the television receiving apparatus.

12. The television receiving apparatus according to claim 1, wherein the first piece of voice data includes a first time value, and the control operation corresponding to the first piece of voice data includes a second time value greater than or less than the first time value.

13. The television receiving apparatus according to claim 1, wherein the voice recognition and language processing is implemented in the television apparatus.

14. A voice signal processing method for a television receiving apparatus, comprising:
detecting a voice input to a microphone of the television receiving apparatus based on voice data input via an interface unit of the television receiving apparatus;
in response to a voice period over a first period of time with voice input being detected, determining that a first piece of voice data in the voice period is received;
sending a first time point of the voice period as a trigger signal of the first piece of voice data, wherein the first time point of the voice period is a start time point or an end time point of the voice period;
sending the first piece of voice data for voice recognition and language processing;
obtaining a second time point associated with first command data corresponding to the first piece of voice data, wherein the first command data is a command content generated after the voice recognition and language processing;
generating a first control signal for a target controlled object based on the command data and a delay time associated with a difference between the first time point of the voice period and the second time point associated with the first command data;
sending the first control signal to the target controlled object to implement a control operation corresponding to the first piece of voice data.

15. The method according to claim 14, wherein the command data comprises a command for moving program content forward or backward a period of time once.

16. The method according to claim 14, wherein the command data is a command for time shifting to a particular chapter or scene of program content.

17. The method according to claim 16, wherein the target controlled object comprises an external device which is capable of connecting with the television receiving apparatus via the interface unit.

18. The method according to claim 17, further comprising:
receiving content data of a target move chapter from the external device;
wherein the target move chapter is determined based on the first control signal by determining whether the first time point of the voice period and the second time point associated with the first command data both fall within a same chapter of the program content.

19. The method according to claim 16, wherein the program content comprises a plurality of chapters or scenes, and the particular chapter or scene of program content has a time duration different from another chapter or scene in the plurality of chapters or scenes.

20. The method according to claim 14, wherein the delay time associated with the difference between the first time point of the voice period and the second time point associated with the first command data comprises a duration of the voice recognition and language processing.

* * * * *